(12) United States Patent
Sugawara

(10) Patent No.: US 6,414,791 B1
(45) Date of Patent: Jul. 2, 2002

(54) OPTICAL SYSTEM FOR PHOTOGRAPHING A STEREOSCOPIC IMAGE, ZOOM LENS AND IMAGE PICKUP OPTICAL SYSTEM

(75) Inventor: Saburo Sugawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/342,382

(22) Filed: Jun. 29, 1999

(30) Foreign Application Priority Data

Jul. 1, 1998 (JP) .......................................... 10-201119
Jun. 24, 1999 (JP) .......................................... 11-178169

(51) Int. Cl.$^7$ ................................................ G02B 5/30
(52) U.S. Cl. ..................... 359/497; 359/386; 359/462; 359/464; 359/480; 359/691; 396/324; 396/327; 396/331; 600/111; 600/117
(58) Field of Search ...................... 348/42–59; 359/691, 359/462, 472, 473, 464, 480, 497, 386; 396/324, 327, 331; 600/111, 117

(56) References Cited

U.S. PATENT DOCUMENTS

| | | | | | |
|---|---|---|---|---|---|
| 3,251,933 | A | * | 5/1966 | Beste .......................... | 178/6.5 |
| 3,737,567 | A | * | 6/1973 | Kratomi ....................... | 178/6.5 |
| 4,671,628 | A | * | 6/1987 | Wirz et al. ................... | 350/515 |
| 4,945,407 | A | | 7/1990 | Winnek ........................ | 358/91 |
| 5,039,214 | A | * | 8/1991 | Nagata et al. ............... | 359/386 |
| 5,255,123 | A | | 10/1993 | Estelle ......................... | 359/684 |
| 5,463,496 | A | * | 10/1995 | Ise ............................... | 359/497 |
| 5,853,240 | A | * | 12/1998 | Tanaka et al. ................ | 353/20 |
| 5,886,816 | A | * | 3/1999 | Faris ............................ | 359/464 |

FOREIGN PATENT DOCUMENTS

| | | |
|---|---|---|
| EP | 0 506 108 A1 | 3/1992 |
| JP | 8-307904 | 11/1996 |
| JP | 10-097628 | 6/1998 |

OTHER PUBLICATIONS

European Search Report dated Dec. 16, 1999.
U.S. application No. 08–251624, filed Nov. 22, 1996.

* cited by examiner

*Primary Examiner*—Cassandra Spyrou
*Assistant Examiner*—Craig Curtis
(74) *Attorney, Agent, or Firm*—Morgan & Finnegan, L.L.P.

(57) ABSTRACT

An optical system is provided with a pair of forward optical components each having a shutter for controlling the amount of transmission of a light from an object, an optical member for laying the optical axes of the pair of forward optical components one upon the other, and a rearward optical component disposed so that the optical axis thereof may coincide with the optical axes laid one upon the other. The optical system alternately varies the amounts of transmission of the light transmitted through the shutters of the pair of forward optical components to thereby time-serially form a parallax image.

12 Claims, 19 Drawing Sheets

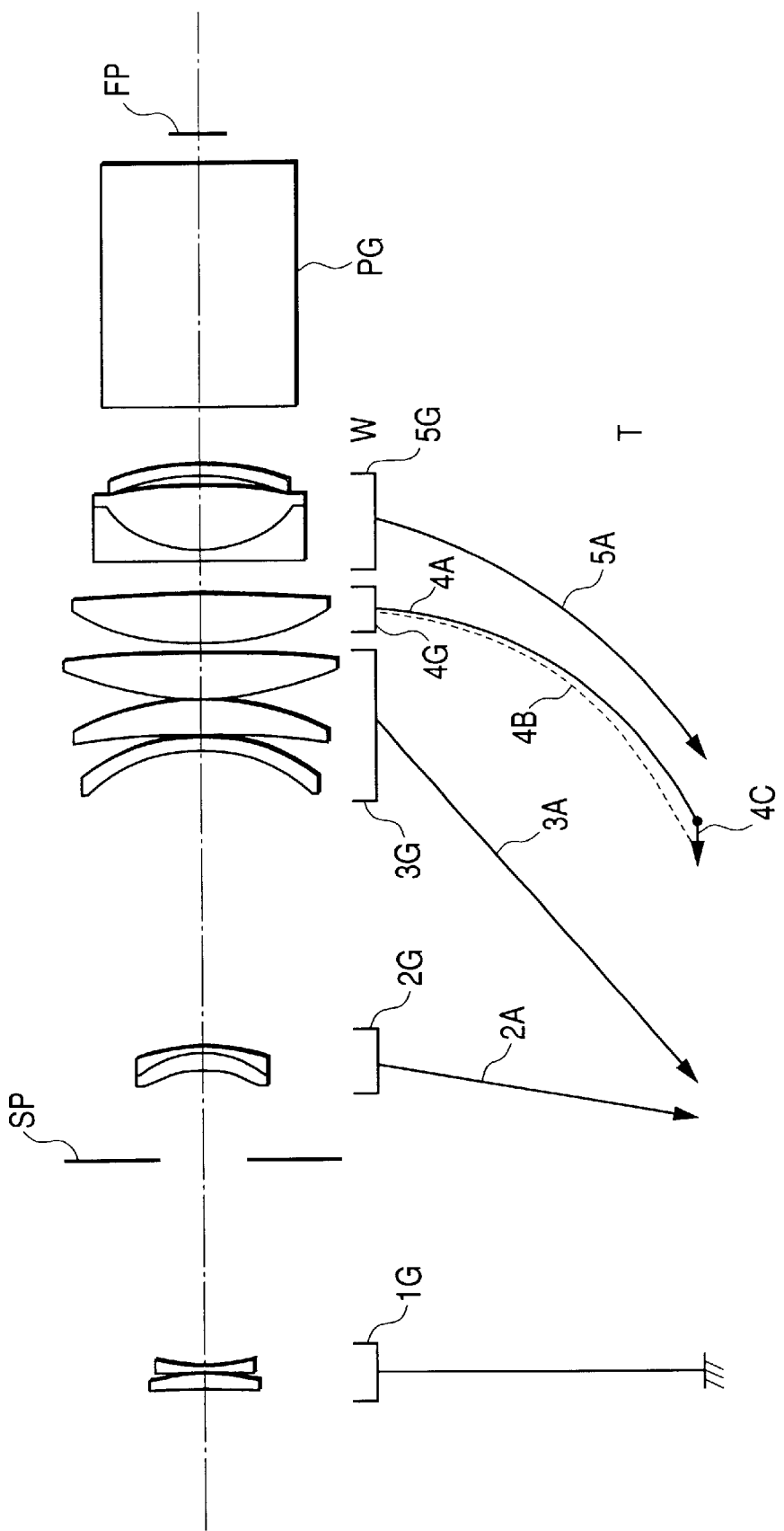

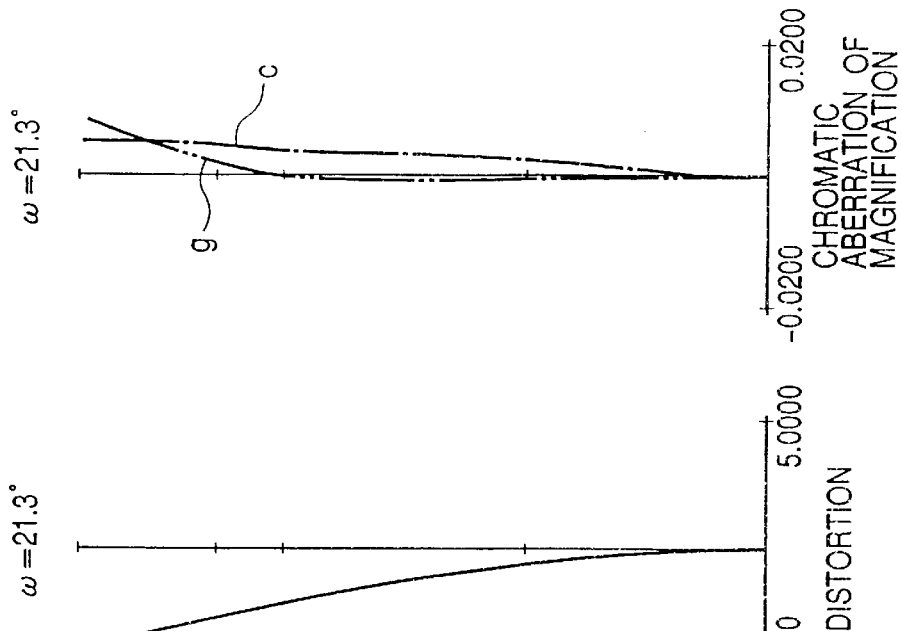

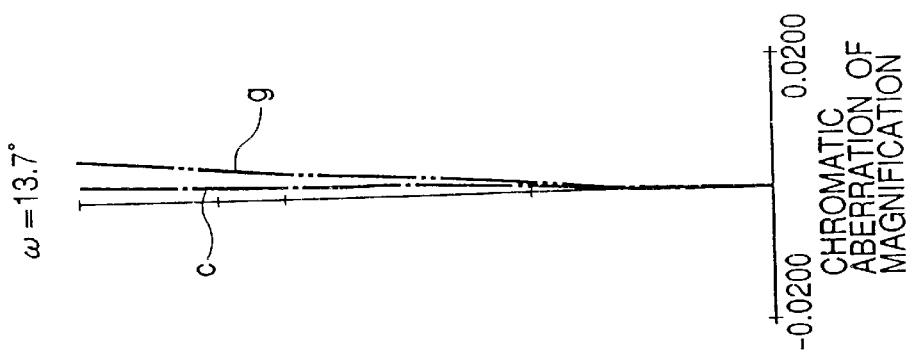
FIG. 7-A  FIG. 7-B  FIG. 7-C  FIG. 7-D

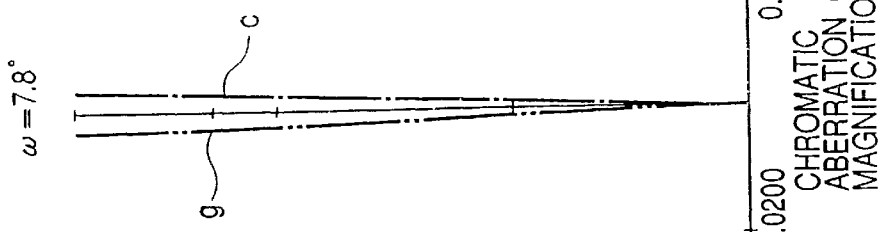
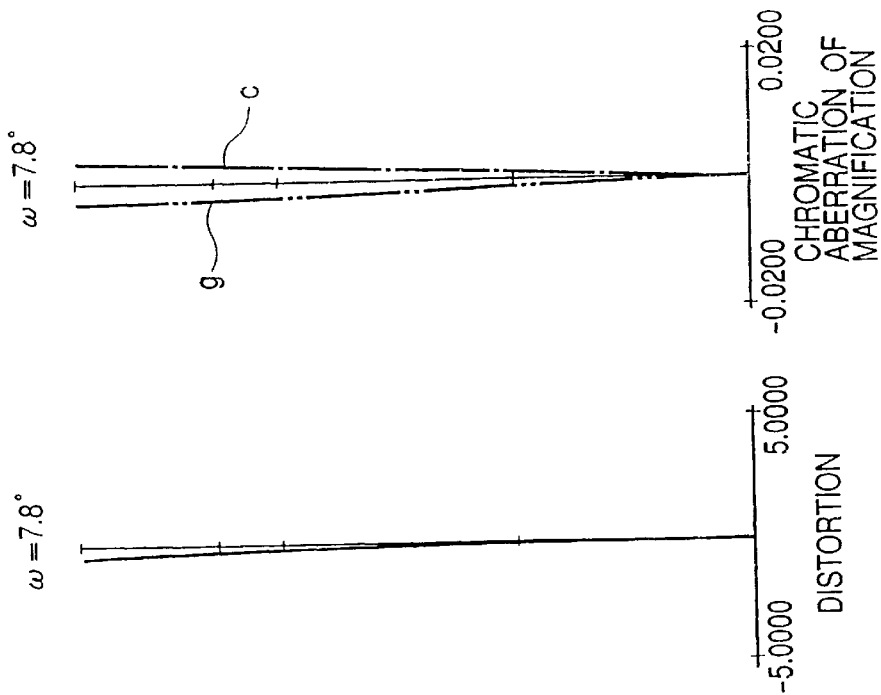
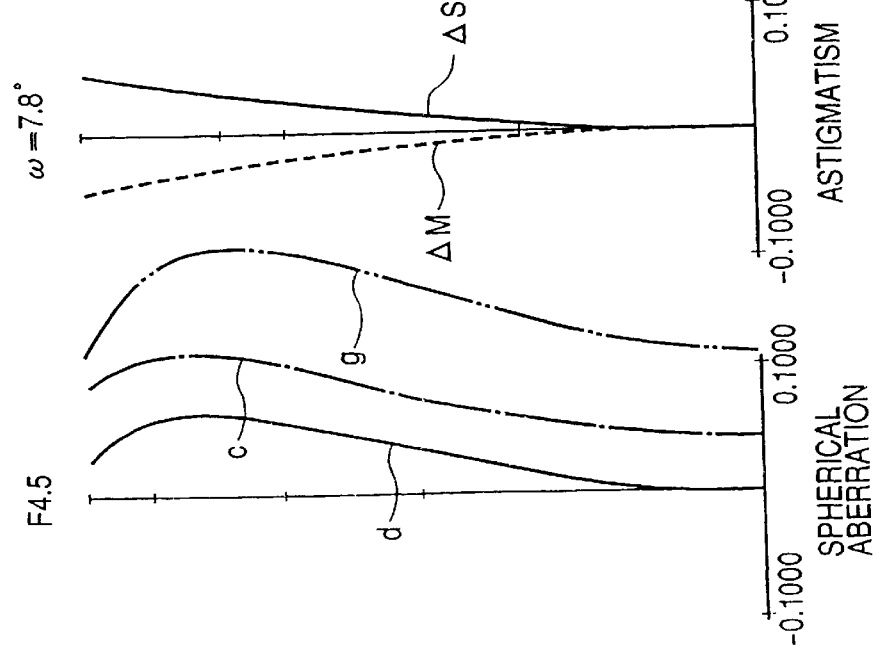
FIG. 8-A  FIG. 8-B  FIG. 8-C  FIG. 8-D

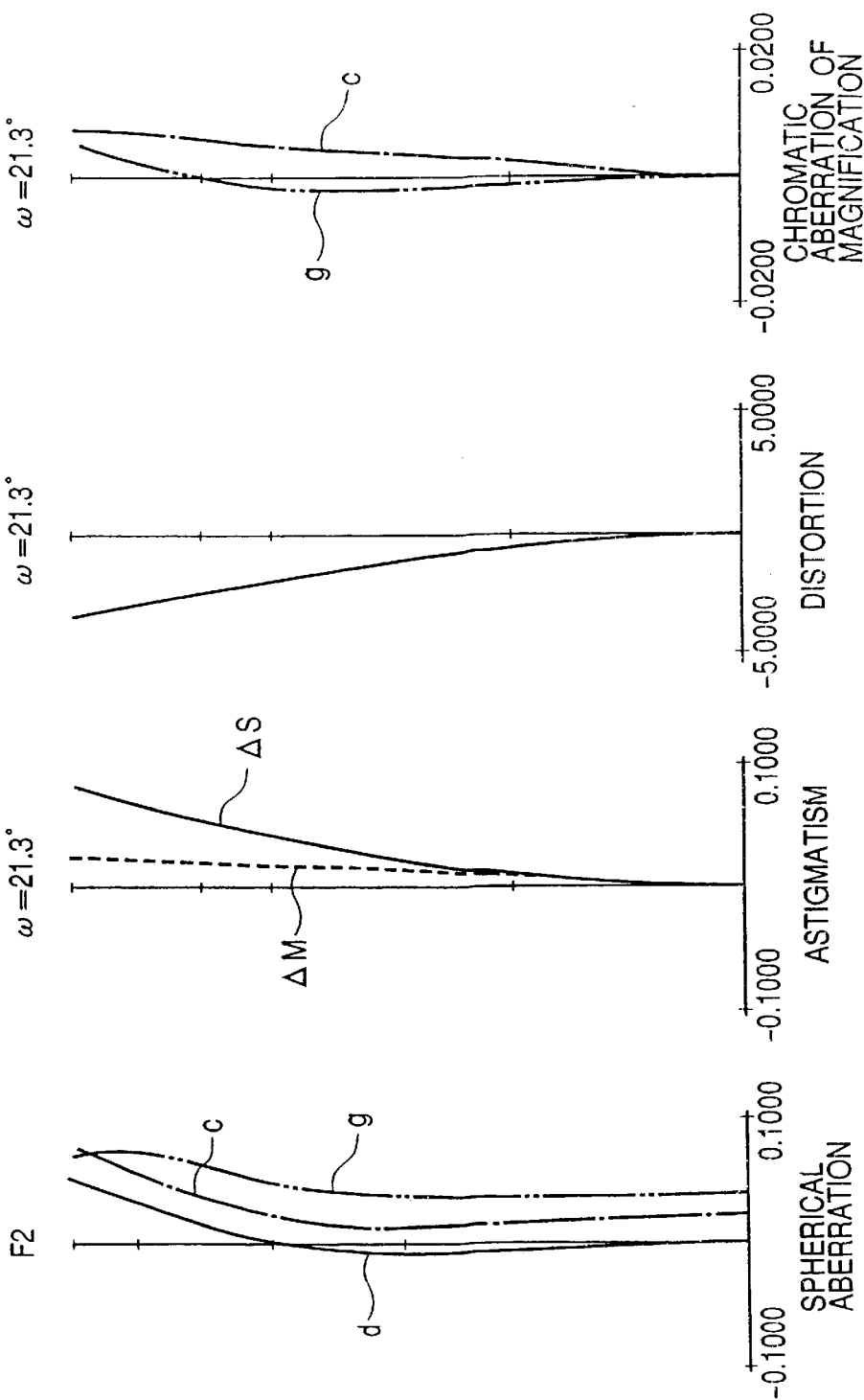

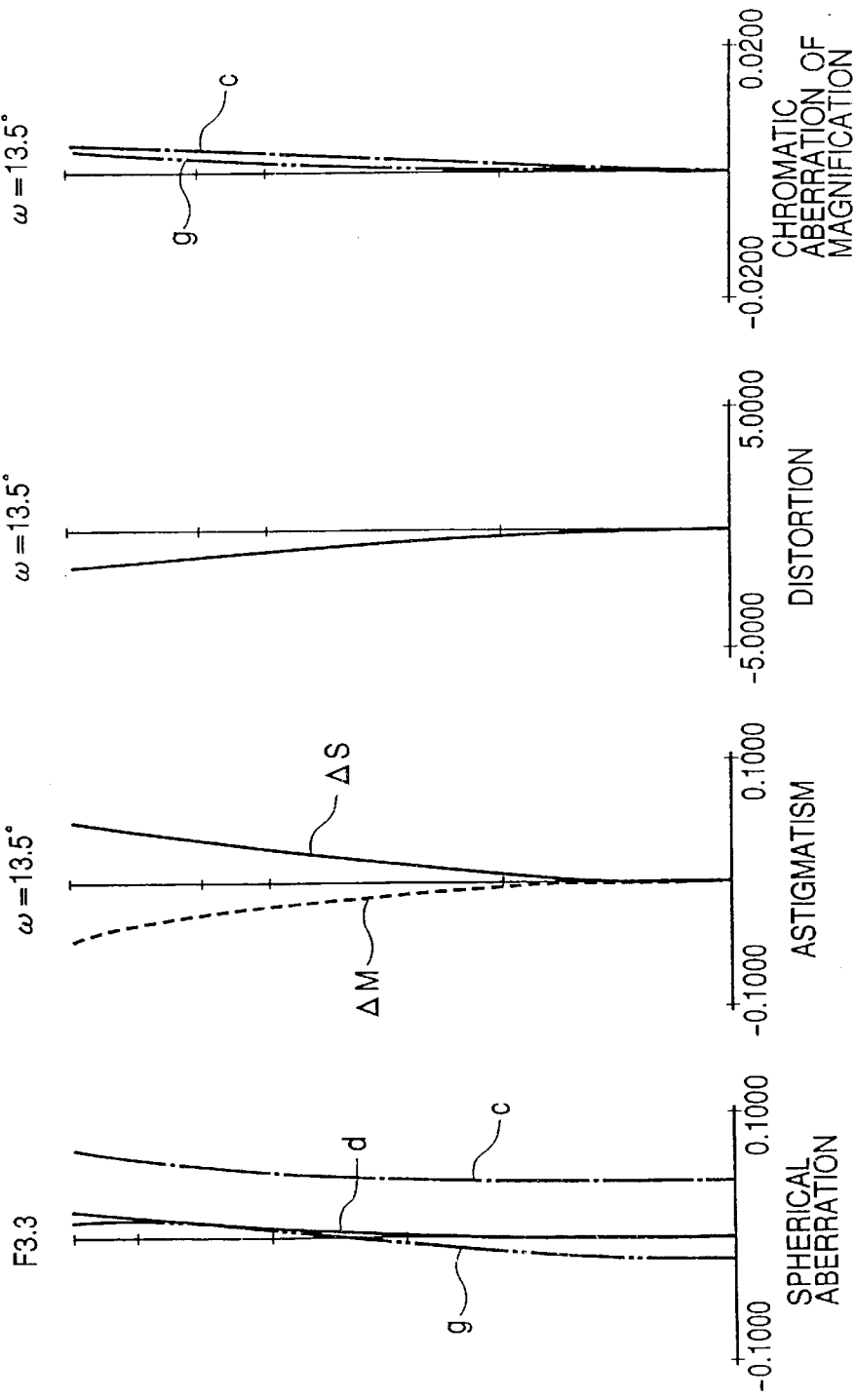

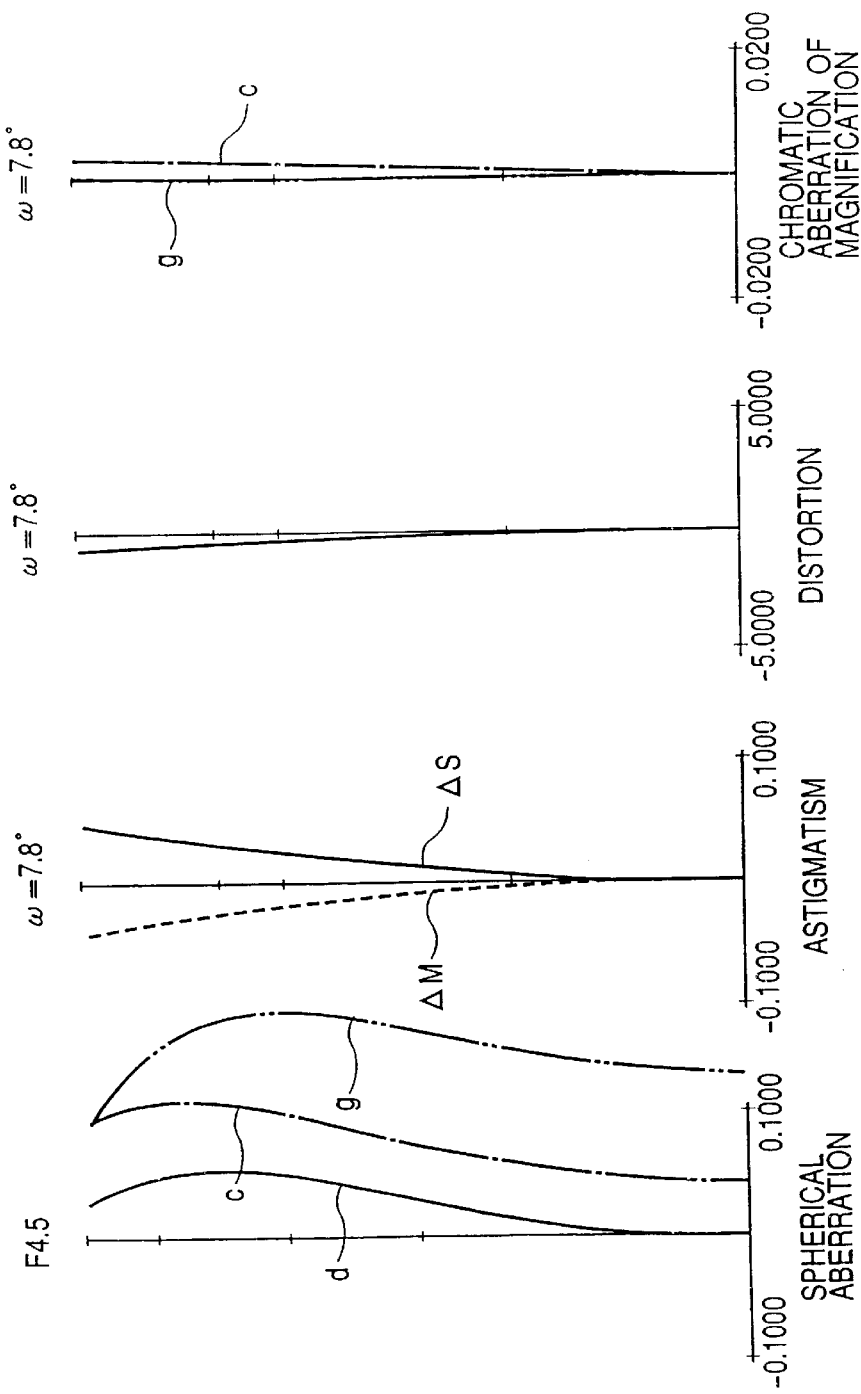

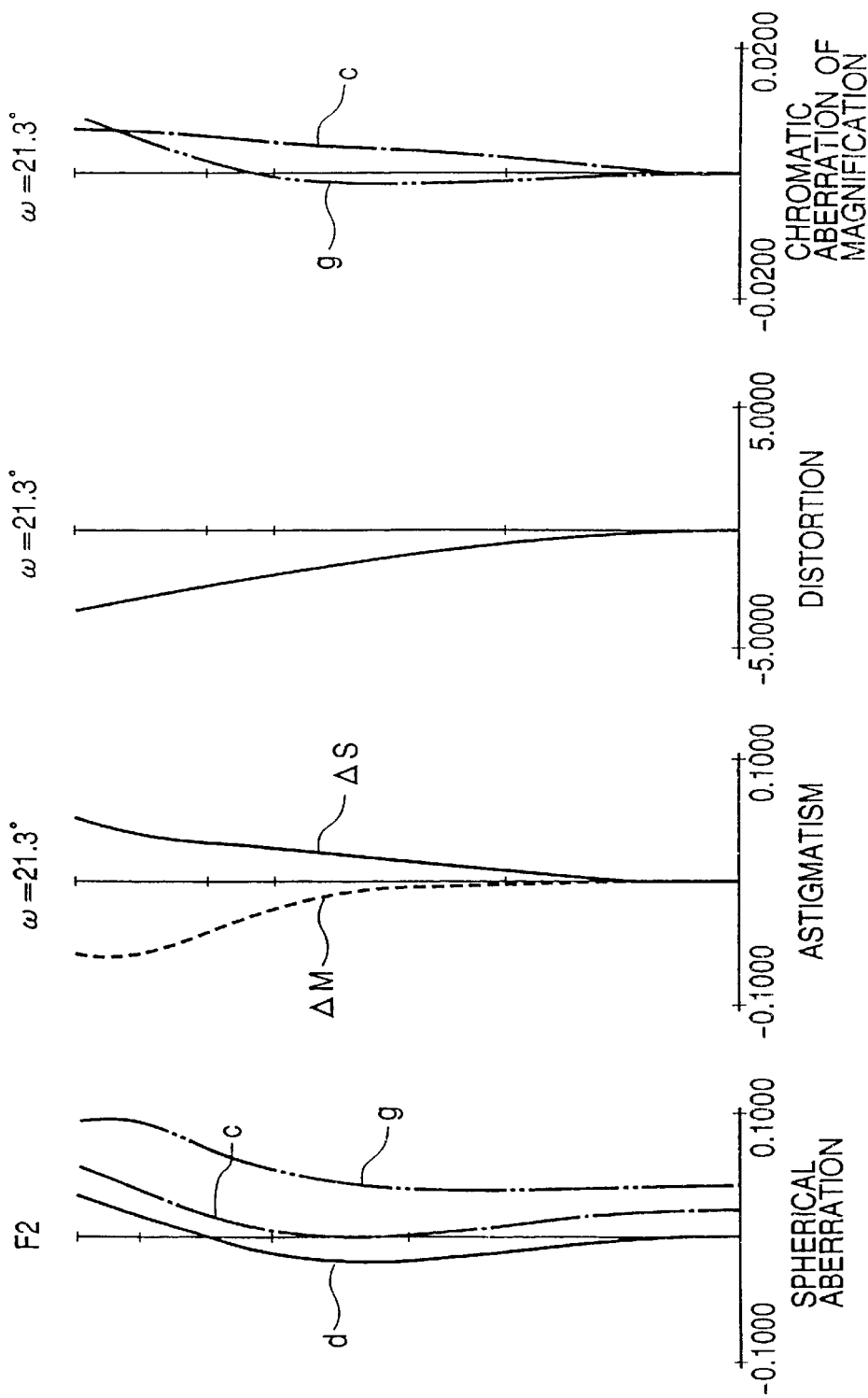

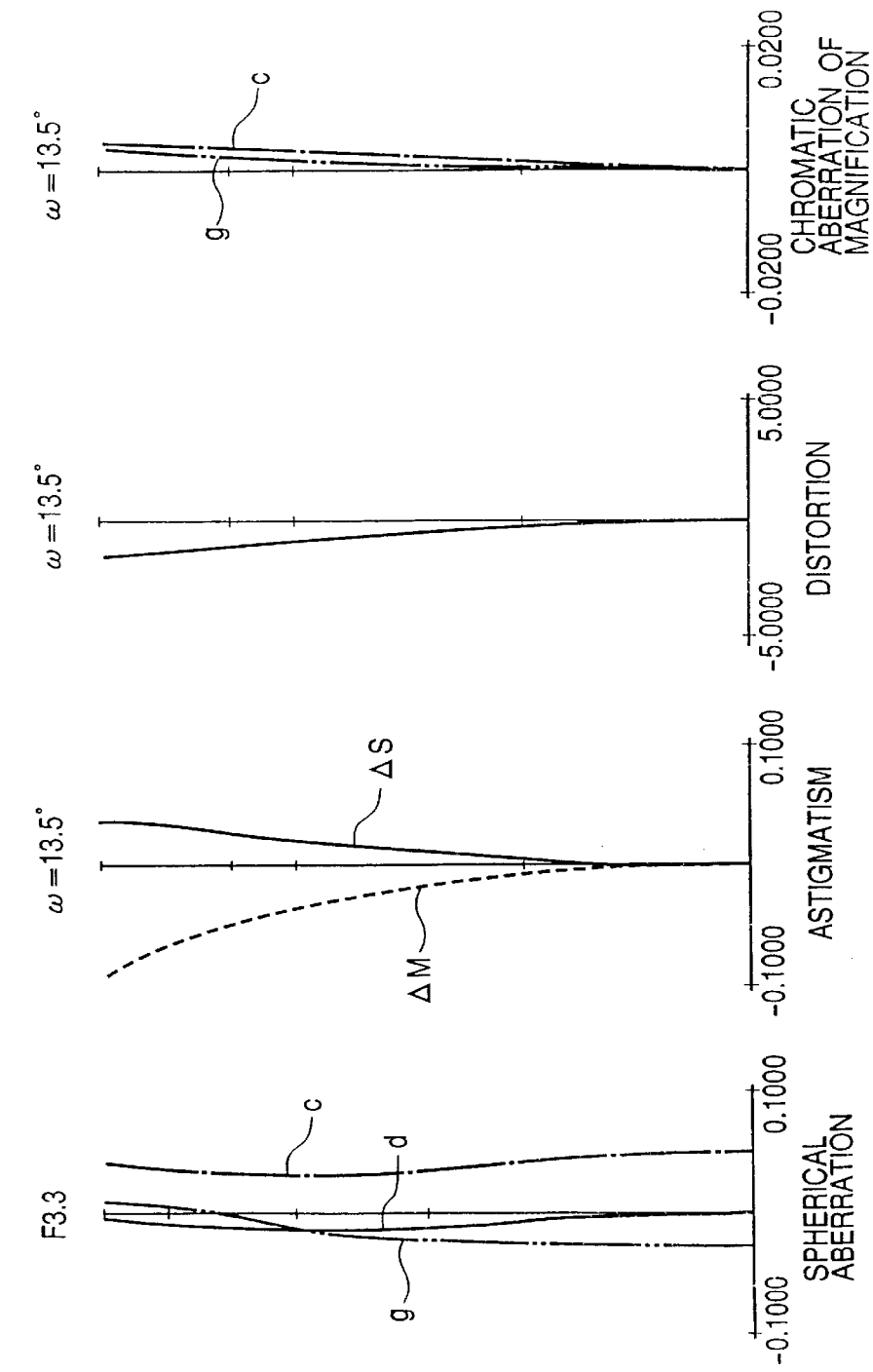

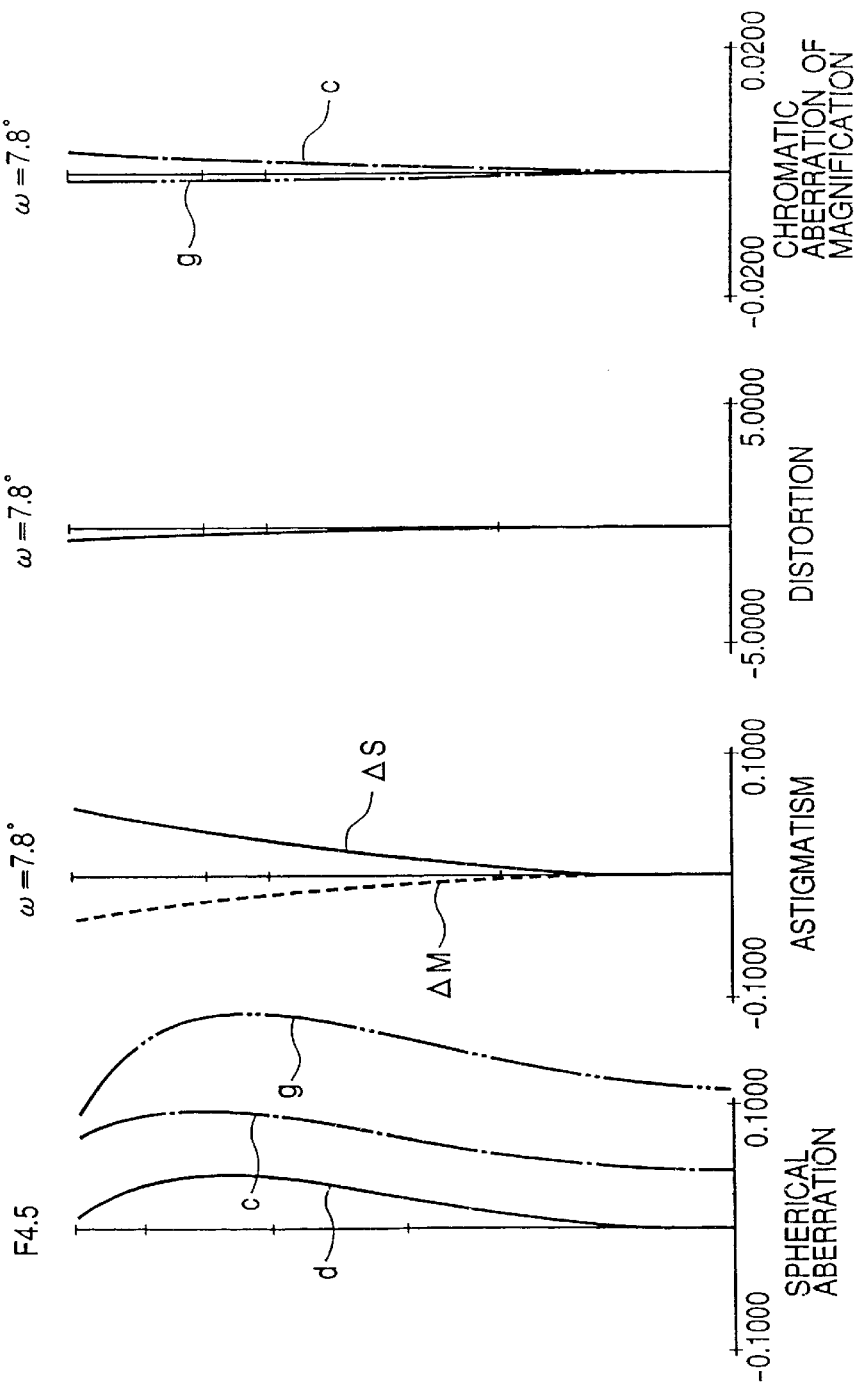

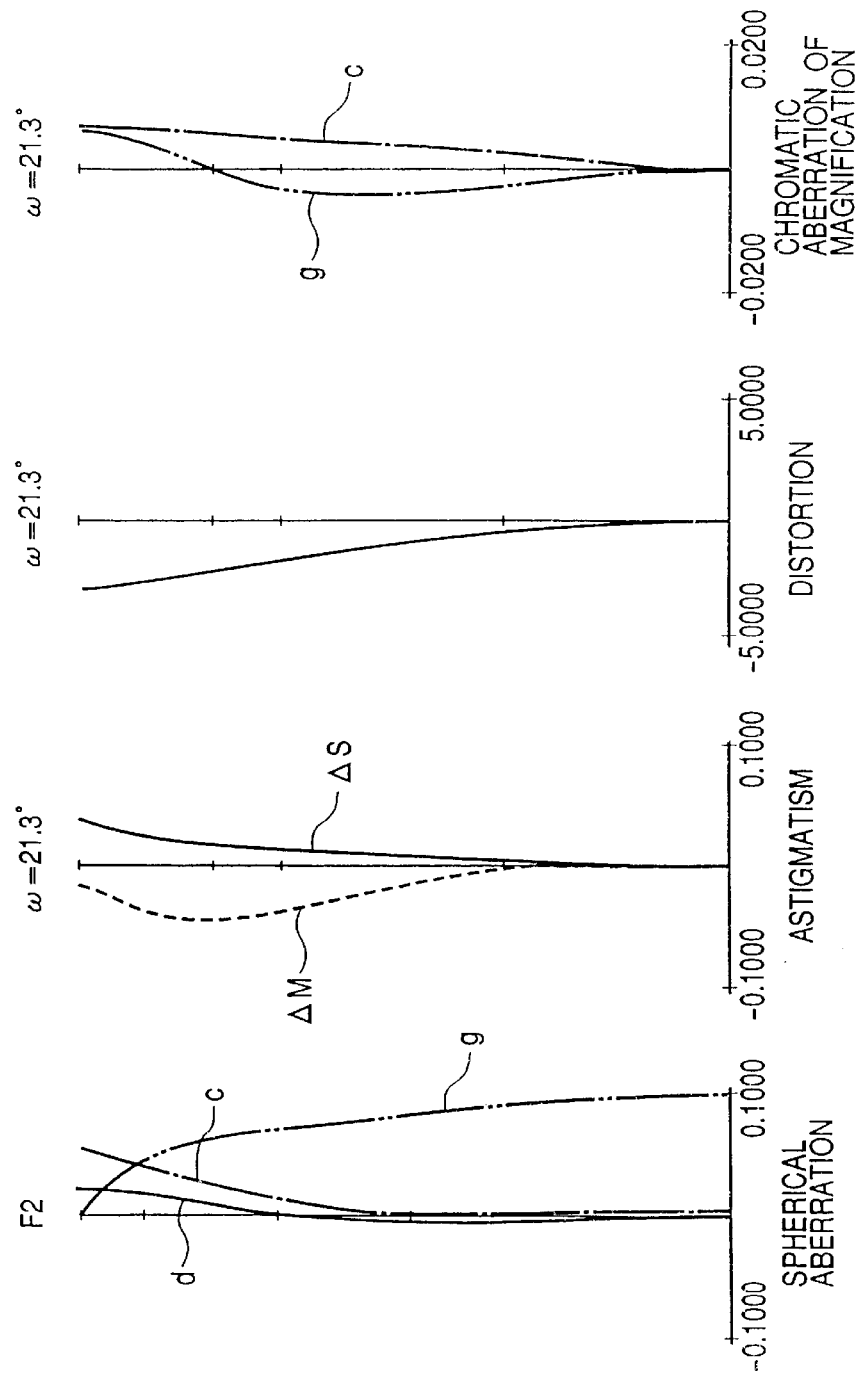

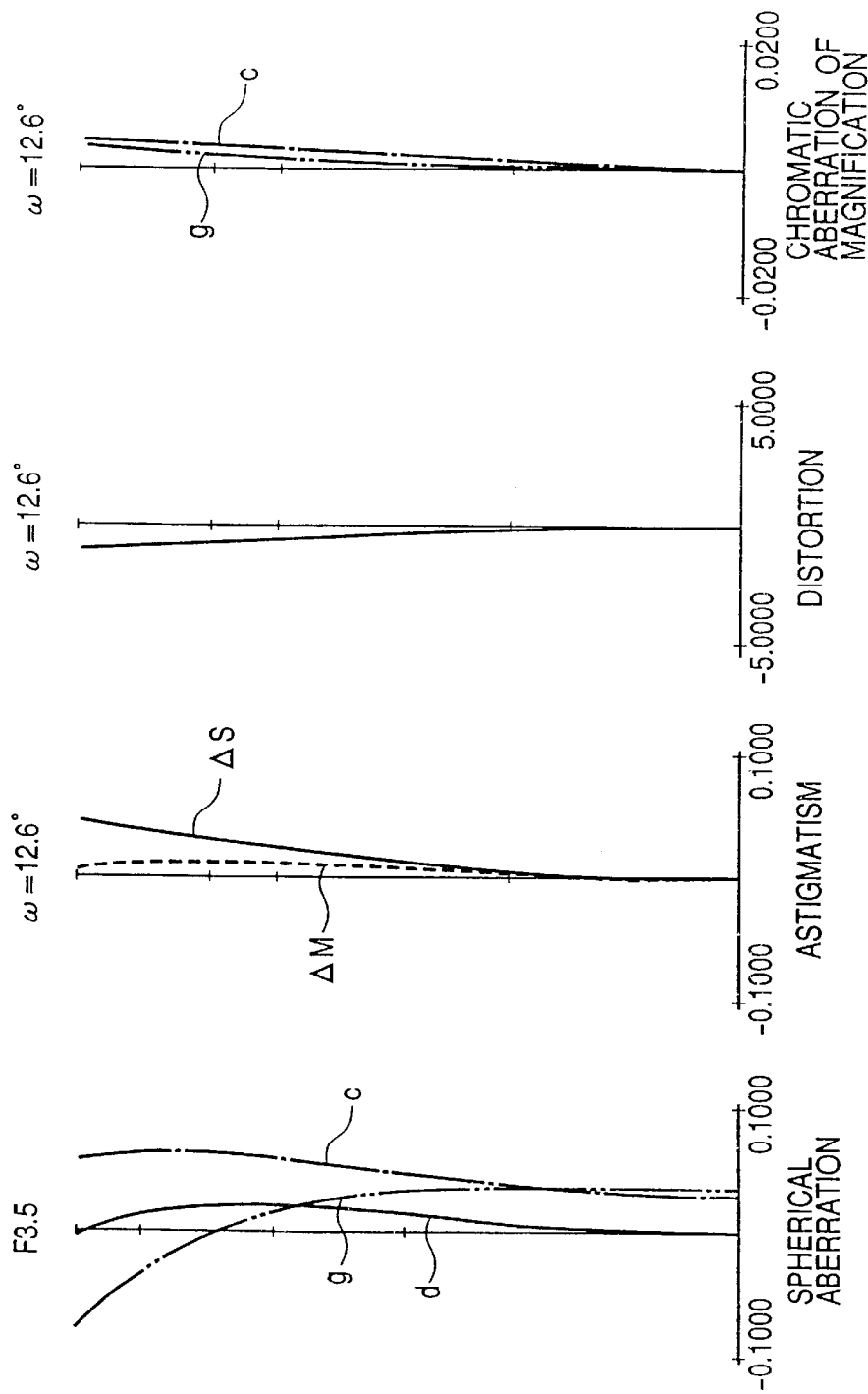

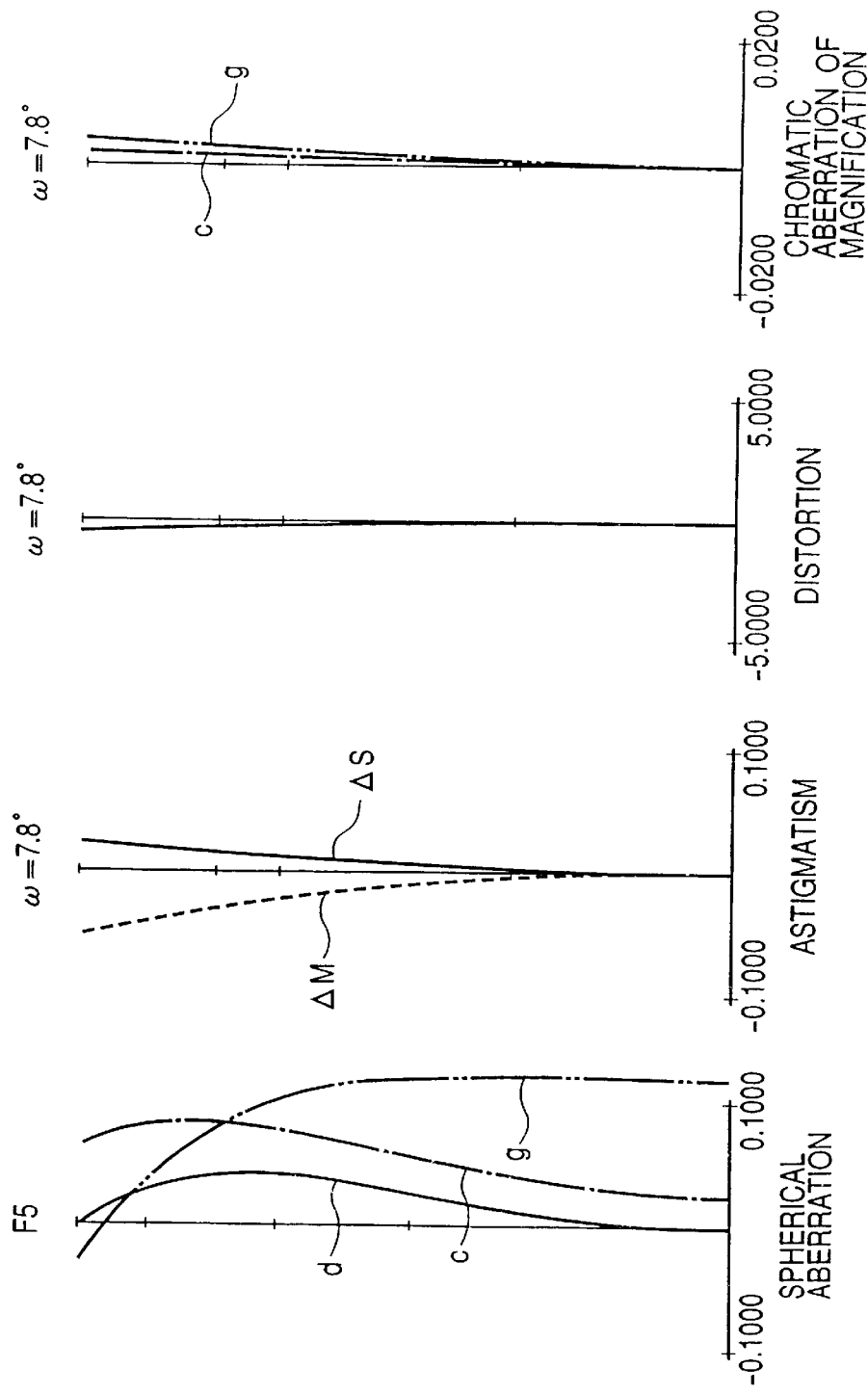

OPTICAL SYSTEM FOR PHOTOGRAPHING A STEREOSCOPIC IMAGE, ZOOM LENS AND IMAGE PICKUP OPTICAL SYSTEM

BACKGROUND OF THE INVENTION

1. Field of the Invention

This invention relates to an optical system for photographing a stereoscopic image and a zoom lens suitable therefor, and an image pickup optical system provided with quantity-of-light controlling means for controlling the quantity of transmitted light by the utilization of polarization.

To observe a stereoscopic image, a plurality of parallax images become necessary. An optical apparatus for photographing a stereoscopic image and a photographing optical system for obtaining a plurality of parallax images are proposed, for example, in Japanese Patent Application Laid-Open No. 8-251624, Japanese Patent Application Laid-Open No. 8-307904, etc.

In FIG. 1 of Japanese Patent Application Laid-Open No. 8-251624, a stereoscopic image photographing optical system is comprised of two right and left variable reflection angle mirrors, two right and left mirrors, two sets of two right and left polarizing filters, two right and left lens systems and an image pickup element. The polarizing filters are rotated to thereby vary the quantity of light based on right and left parallax images, and lights passed through optical paths for right and left parallax images are alternately directed to the image pickup element to thereby obtain parallax images.

Also, in the embodiment of FIG. 2 of Japanese Patent Application Laid-Open No. 8-251624, a stereoscopic image photographing optical system is comprised of two right and left variable reflection angle mirrors, two right and left mirrors, a polarizing beam splitter, a polarizing filter, a lens system and an image pickup element. As in FIG. 1, the polarizing filter is rotated to thereby vary the quantity of light based on right and left parallax images, and lights passed through optical paths for the right and left parallax images are alternately directed to the image pickup element to thereby obtain parallax images.

On the other hand, in Japanese Patent Application Laid-Open No. 8-307904, a stereoscopic image photographing optical system is comprised of two right and left objective lenses, two right and left shutters, a half mirror for coupling two right and left images together, and a variable power optical system for re-imaging the primary imaging planes of the two right and left objective lenses on an image pickup element.

However, the stereoscopic image photographing optical system disclosed in the embodiment of FIG. 1 of Japanese Patent Application Laid-Open No. 8-251624 forms an image with the optical axes of two photo-taking lenses inclined with respect to the image pickup elements, and this has led to the disadvantage that the peripheral portion of the image field becomes blurred.

Also, in the stereoscopic image photographing optical system disclosed in the embodiment of FIG. 2 of Japanese Patent Application Laid-Open No. 8-251624, a polarizing beam splitter comprised of multilayer film is used as an optical path combining element for combining two optical paths. Therefore, there have been disadvantages that the characteristic of spectral reflectance is changed by a change in the angle of incidence of the light beam and that color irregularity occurs in the image field.

Also, as the quantity-of-light controlling means, a polarizing filter plate is used for the control of the transmission and non-transmission of a light beam and therefore, the light after being passed through the quantity-of-light controlling means (shutter) becomes polarized light. Therefore, in an image pickup apparatus using an image pickup element such as a CCD for periodically introducing an image as image pickup means, if a low-pass filter using double refraction is used, there has been the problem that the low-pass effect weakens and black and white moire and color moire occur and the picked-up image becomes unsightly.

Also, the photo-taking light is polarized by a polarizing plate disposed at the object side of the quantity-of-light controlling means, and this also has led to the problem that the luster of the object when a photographer actually sees with the naked eye and the luster of the picked-up image of the object differ remarkably from each other.

On the other hand, in Japanese Patent Application Laid-Open No. 8-307904, the aerial images of the two right and left objective lenses are re-imaged by a relay lens and therefore, the number of lenses constituting the entire optical system becomes great, and this has led to the disadvantage that the construction of the entire apparatus becomes complicated.

SUMMARY OF THE INVENTION

It is an object of the present invention to provide a stereoscopic image photographing optical system in which an optical system for photographing a plurality of parallax images is appropriately set, whereby optical performance is good and color irregularity is not created and a good stereoscopic image (parallax image) can be obtained easily, and a zoom lens suitable therefor.

It is another object of the present invention to provide an image pickup optical system in which when polarization is used to control the quantity of passed light and form the image of an object on an image pickup element such as a CCD, black and white moire and color moire occur little and an image in which the luster of an object becomes natural can be obtained easily, and a stereoscopic image photographing optical system using the same.

The optical system of the present invention is characterized by the provision of:
  a pair of forward optical components each having a shutter for controlling the amount of transmission of a light from an object;
  an optical member for laying the optical axes of said pair of forward optical components one upon the other; and
  a rearward optical component disposed so that the optical axis thereof may coincide with said optical axes laid one upon the other;
  said optical system alternately varying the amounts of transmission of the light transmitted through the shutters of said pair of forward optical components to thereby time-serially form a parallax image.

Also, the zoom lens of the present invention is characterized by the provision, in succession from the object side, of:
  a first lens unit of negative refractive power;
  a stop;
  a second lens unit; and
  at least two lens units of positive refractive power movable from the image plane side toward the object side independently of each other during the focal length change from the wide angle end (maximum wide-angle state) to the telephoto end (maximum telephoto state), said at least two lens units of positive refractive power having a meniscus negative lens convex toward the image plane side on the side most adjacent to the object.

Also, the zoom lens of the present invention from another point of view is characterized by the provision, in succession from the object side, of:

a first lens unit of negative refractive power fixed during focal length change;

a stop fixed during the focal length change;

a second lens unit; and at least two lens units of positive refractive power movable from the image plane side toward the object side independently of each other during the focal length change from the wide angle end to the telephoto end.

Also, the image pickup optical system of the present invention is characterized by the provision of:

quantity-of-light controlling means for controlling the amount of transmission of light by the utilization of polarization;

an image pickup lens for forming an image by the use of the light transmitted through said quantity-of-light controlling means; and a quarter wavelength plate disposed on at least one of the object side and the image plane side of said quantity-of-light controlling means.

Also, the image pickup apparatus of the present invention is characterized by the provision of:

quantity-of-light controlling means for controlling the amount of transmission of light by the utilization of polarization;

an image pickup lens for forming an image by the use of the light transmitted through said quantity-of-light controlling means;

an optical low-pass filter utilizing double refraction;

an image pickup element for periodically introducing the image thereinto; and a quarter wavelength plate disposed on at least one of the object side and the image plane side of said quantity-of-light controlling means.

BRIEF DESCRIPTION OF THE DRAWINGS

FIG. 5 is a cross-sectional view of the zoom lens of Numerical Value Embodiment 4 of the present invention.

FIGS. 6-A, 6-B, 6-C and 6-D show spherical aberration, astigmatism, distortion and chromatic aberration of magnification, respectively, at the wide angle end of the zoom lens of Numerical Value Embodiment 1 of the present invention.

FIGS. 7-A, 7-B, 7-C and 7-D show spherical aberration, astigmatism, distortion and chromatic aberration of magnification, respectively, at the intermediate portion of the zoom lens of Numerical Value Embodiment 1 of the present invention.

FIGS. 8-A, 8-B, 8-C and 8-D show spherical aberration, astigmatism, distortion and chromatic aberration of magnification, respectively, at the telephoto end of the zoom lens of Numerical Value Embodiment 1 of the present invention.

FIGS. 9-A, 9-B, 9-C and 9-D show spherical aberration, astigmatism, distortion and chromatic aberration of magnification, respectively, at the wide angle end of the zoom lens of Numerical Value Embodiment 2 of the present invention.

FIGS. 10-A, 10-B, 10-C and 10-D show spherical aberration, astigmatism, distortion and chromatic aberration of magnification, respectively, at the intermediate portion of the zoom lens of Numerical Value Embodiment 2 of the present invention.

FIGS. 11-A, 11-B, 11-C and 11-D show spherical aberration, astigmatism, distortion and chromatic aberration of magnification, respectively, at the telephoto end of the zoom lens of Numerical Value Embodiment 2 of the present invention.

FIGS. 12-A, 12-B, 12-C and 12-D show spherical aberration, astigmatism, distortion and chromatic aberration of magnification, respectively, at the wide angle end of the zoom lens of Numerical Value Embodiment 3 of the present invention.

FIGS. 13-A, 13-B, 13-C and 13-D show spherical aberration, astigmation, distortion and chromatic aberration of magnification, respectively, at the intermediate portion of the zoom lens of Numerical Value Embodiment 3 of the present invention.

FIGS. 14-A, 14-B, 14-C and 14-D show spherical aberration, astigmation, distortion and chromatic aberration of magnification, respectively, at the telephoto end of the zoom lens of Numerical Value Embodiment 3 of the present invention.

FIGS. 15-A, 15-B, 15-C and 15-D show spherical aberration, astigmation, distortion and chromatic abberration of magnification, respectively, at the wide angle end of the zoom lens of Numerical Value Embodiment 4 of the present invention.

FIG. 16-A, 16-B, 16-C and 16-D show spherical aberration, astigmatism, distortion and chromatic aberration of magnification, respectively, at the intermediate portion of the zoom lens of Numerical Value Embodiment 4 of the present invention.

FIG. 17-A, 17-B, 17-C and 17-D show spherical aberration, astigmatism, distortion and chromatic aberration of magnification, respectively, at the telephoto end of the zoom lens of Numerical Value Embodiment 4 of the present invention.

DESCRIPTION OF THE PREFERRED EMBODIMENTS

Figure 1:
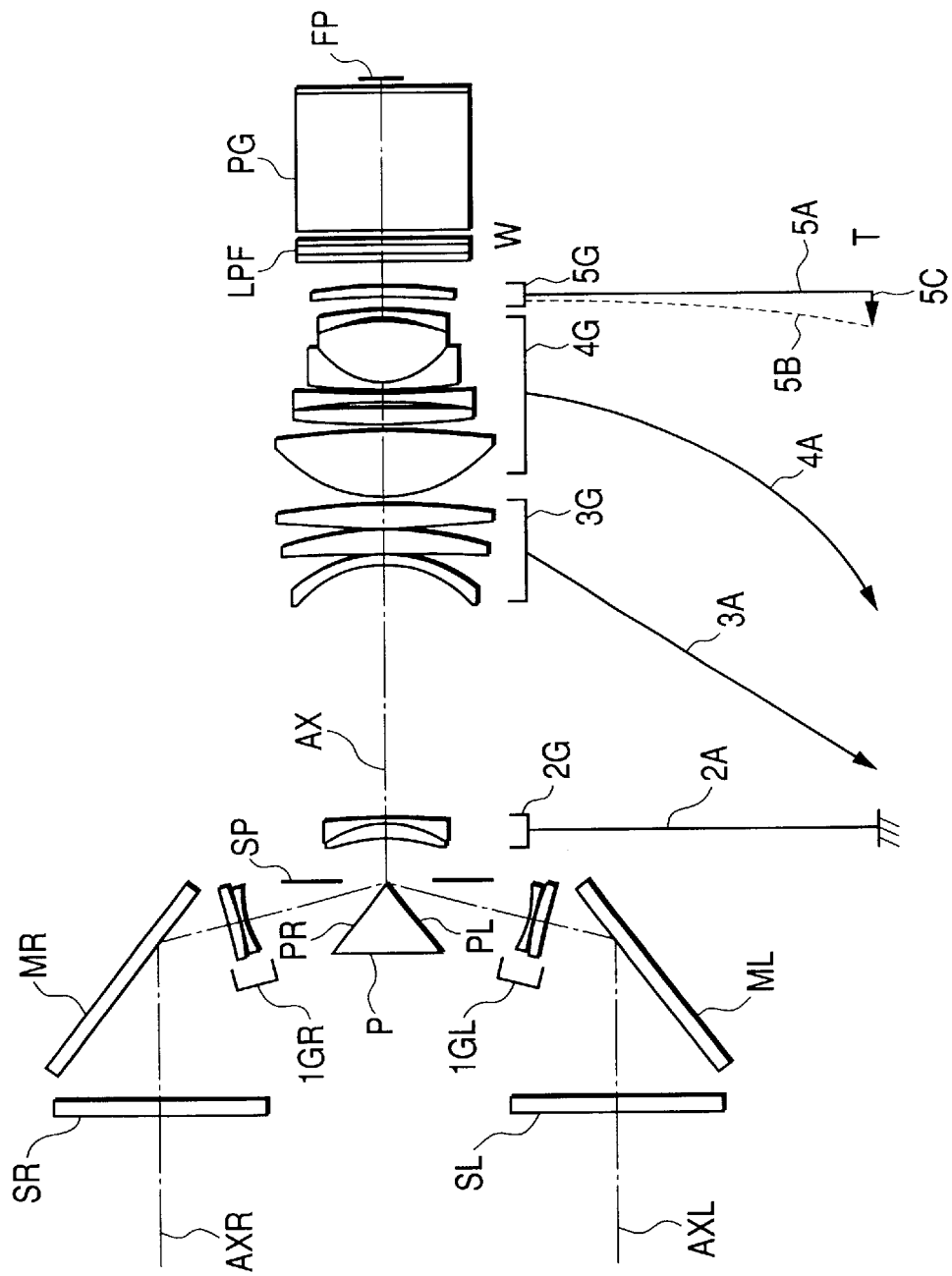
FIG. 1 is a cross-sectional view of the essential portions of the stereoscopic photographing optical system of the present invention.

FIG. 1 is an optical cross-sectional view of the stereoscopic image photographing optical system of Embodiment 1 of the present invention. The stereoscopic image photographing optical system (photographing optical system) of FIG. 1 shows a case where two parallax images are time-serially obtained.

The photographing optical system of FIG. 1 is comprised of left and right shutters SL and SR disposed on left and right optical axes AXL and AXR disposed substantially parallel to each other with a spacing substantially equal to the width between the human eyes, left and right reflecting mirrors ML and MR for inwardly deflecting the left and right optical axes, respectively, left and right first lens units 1GL and 1GR of negative refractive power having the same construction, a triangle pole prism (composite optical element) P disposed near the stop position of the photographing optical system and having its surfaces PL and PR provided with reflecting coats to lay the left and right optical axes AXL and AXR one upon the other, a stop SP for adjusting the quantity of light, a second lens unit 2G of generally weak negative refractive power normally fixed relative to the image plane FP, a third lens unit 3G of generally positive refractive power movable on the optical axis from the image side toward the object side during the focal length change from the wide angle end to the telephoto end, a fourth lens unit 4G of generally positive refractive power movable on the optical axis for the correction of the image plane position resulting from the focal length change from the wide angle end to the telephoto end, a fifth lens unit 5G of generally positive refractive power movable on the optical axis in conformity with a change in the object distance, an optical low-pass filter LPF and a color separation prism PG. The color separation prism PG serves to resolve the light from the object into three color lights R, G and B. Thus, three image pickup elements are disposed on the image plane FP in conformity with the optical paths of the respective color lights, but in FIG. 1, they are not shown for simplicity. As the image pickup elements, use is made of CCD's or the like for periodically dividing an image and introducing it.

In FIG. 1, during the focal length change from the wide angle end to the telephoto end, the third lens unit 3G and the fourth lens unit 4G are moved on the optical axis toward the object side as indicated by loci 3A and 4A shown in FIG. 1 to thereby effect the focal length change and the correction of the image plane resulting from the focal length change. During the focal length change from the wide angle end to the telephoto end, the fifth lens unit 5G is fixed relative to the image plane as indicated by a locus 5A when the object distance is infinity, but in conformity with the fluctuation of the object distance, for example, in the case of an object at close range, the fifth lens unit is slightly moved toward the object side as indicated by a dotted-line locus 5B to thereby effect the correction of the image plane position relative to the fluctuation of the object distance.

Arrow 5C shows the axial movement of the fifth lens unit 5G when focusing on an object at infinity to an object at close range is effected. The first lens unit 1GL (1GR) to the fifth lens unit 5G together constitute a photographing optical system for the left eye (the right eye). The shutter SL (SR) to the first lens unit 1GL (1GR) together constitute a forward lens system, and the second lens unit 2G to the fifth lens unit 5G together constitute a rearward lens system.

As shown in FIG. 1, the entrance pupil (stop) SP of the photographing optical system is provided at the relatively object side in the photographing optical system, and a triangular prism P is provided at the entrance pupil SP so as to direct left and right images (parallax images) to the second lens unit 2G side.

In the present embodiment, a stop opening is divided into two by the triangular prism (composite optical element) provided at the stop SP. Design is made such that the optical axis of the forward lens system and the optical axis of the rearward lens system intersect with each other on a ridgeline containing the vertical angle of the triangle pole prism P. The left and right shutters SL and SR are alternately changed over, whereby left and right parallax images are time-serially obtained by an image pickup element disposed on the image plane FP.

In the present embodiment, by the construction as described above, the diameter of the forward lens of the photographing optical system is made small and the expanse of the off-axial light beam on the object side is suppressed. Thereby, the two left and right reflecting mirrors ML and MR and the two left and right shutters SL and SR can be downsized to thereby realize a stereoscopic photographing optical system compact as a whole.

When it is desired to further downsize the shutters SL and SR, it is preferable to dispose the shutters between the reflecting mirrors ML, MR and the first lens units 1GL, 1GR. Mechanical shutters or liquid crystal shutters may be used as the shutters SL and SR.

Also, in the embodiment of FIG. 1, the angle (vertical angle) formed between the two reflecting surfaces PL and PR of the triangular prism P is set to 75° with the eclipse of the effective light beam by the stop SP and the downsizing of the reflecting mirrors taken into account.

Also, a single focal length changing optical system is used in the construction of the present embodiment, and this leads to the advantage that the error of left and right magnifications and the deviation of the optical axis do not occur during focal length change.

In the embodiment of FIG. 1, the correction of the image plane position (focusing) relative to the fluctuation of the object distance is effected by the fifth lens unit, but the correction of the image plane position relative to the fluctuation of the object distance is possible by any other lens unit than the first lens unit.

Also, for further adjustment of the quantity of light, besides a method of varying the opening of the stop SP, a quantity-of-light attenuating filter may be put in and out between the first lens units and the reflecting mirrors or between the first lens units and the composite prism P in conformity with the brightness of the object.

Further, the reflecting mirrors ML and MR may be made rotatable and the distance at which the left and right optical axes AXL and AXR intersect with each other on the object side may be made variable in conformity with distance information obtained from a distance measuring device, not shown, to thereby obtain parallax images. According to this, there can be obtained a good stereoscopic image conforming to the object distance.

Figure 2:
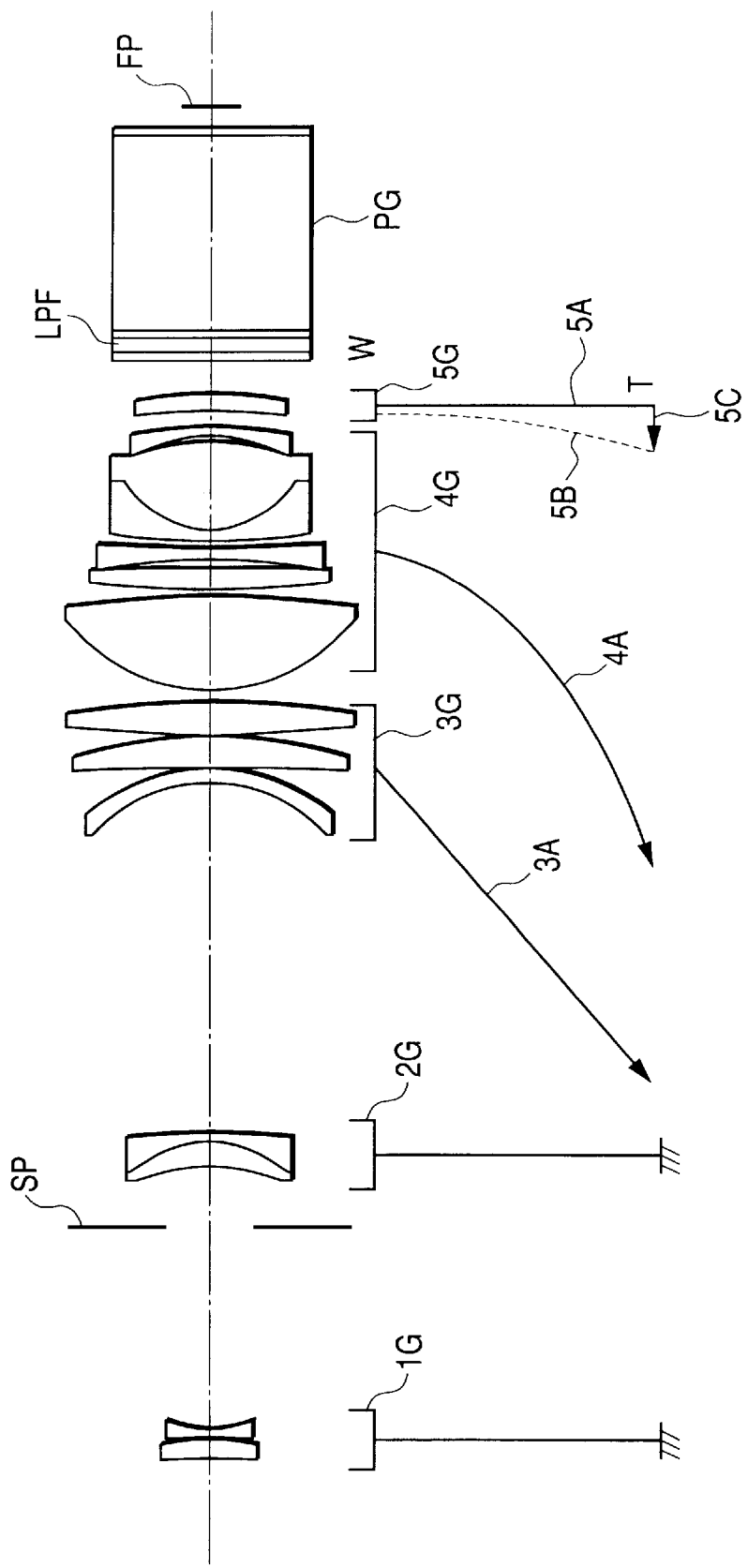
FIG. 2 is a cross-sectional view of the zoom lens of Numerical Value Embodiment 1 of the present invention.

FIG. 2 is a lens cross-sectional view of Numerical Value Embodiment 1 of a zoom lens used in the stereoscopic image photographing optical system of the present invention.

The lens cross-sectional view of Numerical Value Embodiment 1 of FIG. 2 is the same as when the optical path of the embodiment of FIG. 1 is developed, with the exception that the first lens unit is shown as being single. In FIG. 2, the shutters SL, SR, mirrors ML, MR and prism P of FIG. 1 are not shown. Actually, there are two first lens units 1G (1GL and 1GR) for the left and right, as shown in FIG. 1.

Figure 3:
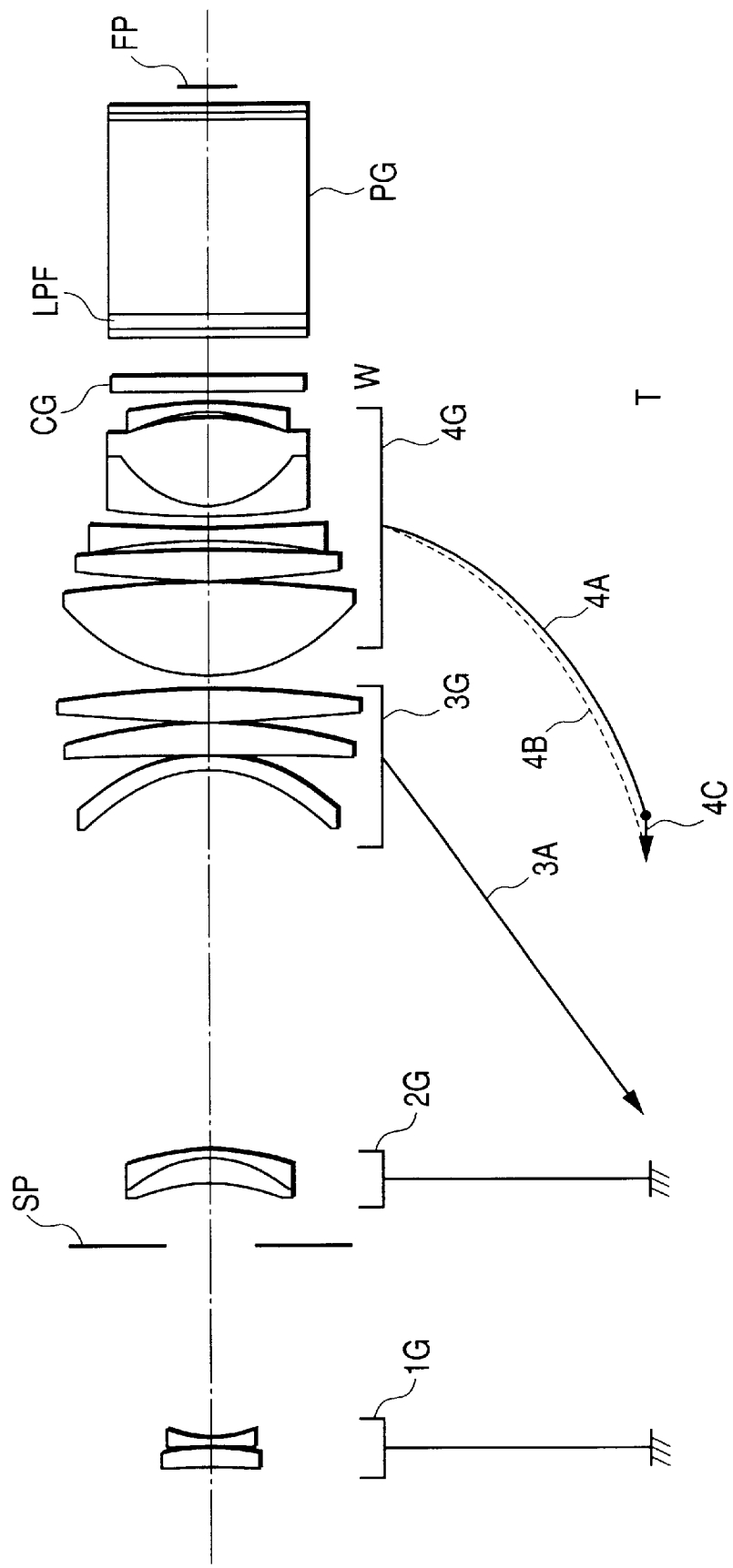
FIG. 3 is a cross-sectional view of the zoom lens of Numerical Value Embodiment 2 of the present invention.

FIG. 3 is a lens cross-sectional view of Numerical Value Embodiment 2 of the zoom lens used in the stereoscopic image photographing optical system of the present invention.

In FIG. 3, a first lens unit 1G of negative refractive power and a second lens unit 2G of weak negative refractive power are normally fixed relative to the image plane FP, and a stop SP is disposed between the first lens unit 1G and the second lens unit 2G.

A third lens unit 3G of positive refractive power is moved on the optical axis from the image plane side toward the object side as indicated by a locus 3A during the focal length change from the wide angle end to the telephoto end, and a fourth lens unit 4G of positive refractive power is moved on the optical axis as indicated by a locus 4A for the correction of the image plane position resulting from the focal length change of the third lens unit 3G. The correction of the image plane position (focusing) relative to the fluctuation of the object distance is effected with the fourth lens unit 4G axially moved as indicated by 4A, 4B and 4C. 4A indicates the locus when in an object at infinity, focal length change is effected from the wide angle end to the telephoto end, 4B indicates the locus when in an object at close range, focal length change is effected from the wide angle end to the telephoto end, and 4C indicates the axial movement when at the telephoto end, focusing is effected from the object at infinity to the object at close range. CG designates cover glass for preventing the entry of dust into the zoom lens. LPF denotes an optical filter such as a low-pass filter, and PG designates a color separation prism.

Figure 4:
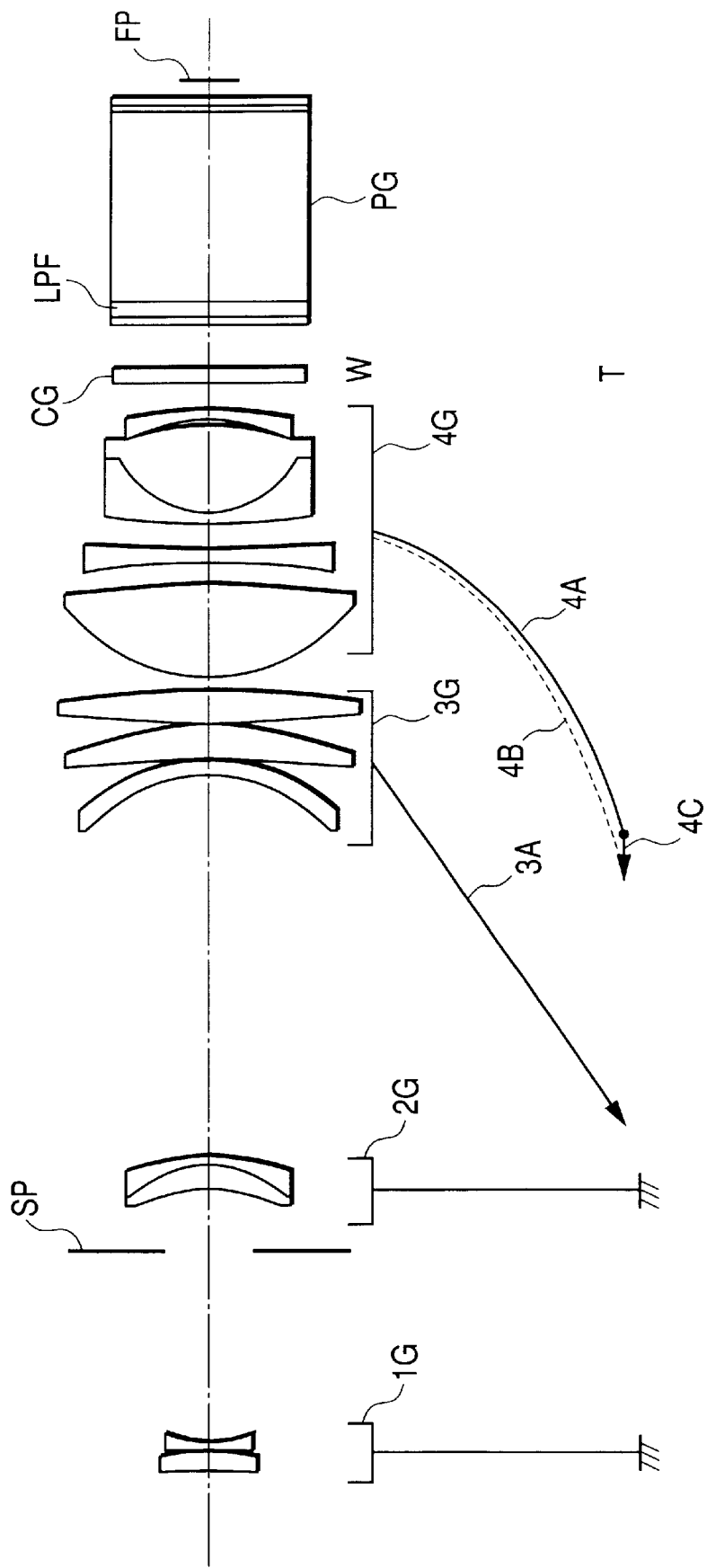
FIG. 4 is a cross-sectional view of the zoom lens of Numerical Value Embodiment 3 of the present invention.

FIG. 4 is a lens cross-sectional view of Numerical Value Embodiment 3 of the zoom lens used in the stereoscopic image photographing optical system of the present invention. This embodiment is substantially similar to Numerical Value Embodiment 2 of FIG. 3 with the exception that the lens construction of a fourth lens unit 4G differs.

FIG. 5 is a lens cross-sectional view of Numerical Value Embodiment 4 of the zoom lens used in the stereoscopic image photographing optical system of the present invention.

In FIG. 5, a first lens unit 1G of negative refractive power is normally fixed relatively to the image plane FP, a second lens unit 2G of weak negative refractive power is moved on the optical axis from the image plane side toward the object side during the focal length change from the wide angle end to the telephoto end, a third lens unit 3G of positive refractive power is moved on the optical axis from the image plane side toward the object side during the focal length change from the wide angle end to the telephoto end, a fourth lens unit 4G of positive refractive power is moved on the optical axis from the image plane side toward the object side for the correction of the image plane position resulting from the focal length change during the focal length change from the wide angle end to the telephoto end, and a fifth lens unit 5G of negative refractive power is moved on the optical axis from the image plane side toward the object side during the focal length change from the wide angle end to the telephoto end.

During focal length change, the second lens unit 2G is also made movable, whereby the amounts of movement of the third and subsequent lens units can be increased, and the curtailment of the number of lenses is realized by an increase in the degree of freedom of design by the increase in the movable lens units.

4A indicates the locus when in an object at infinity, focal length change is effected from the wide angle end to the telephoto end, 4B indicates the locus when in an object at close range, focal length change is effected from the wide angle end to the telephoto end, and 4C indicates the axial movement when at the telephoto end, focusing is effected from the object at infinity to the object at close range.

The zoom lens used in the photographing optical system described in each of the above-described embodiments is provided, in succession from the object side, with a first lens unit of negative refractive power, a stop, a second lens unit of weak refractive power, and at least two lens units of positive refractive power, and said at least two lens units of positive refractive power are moved from the image plane side toward the object side during the focal length change from the wide angle end to the telephoto end and has a meniscus negative lens convex toward the image plane side on the side most adjacent to the object side, whereby the image plane side principal points of the at least two lens units of positive refractive power are moved toward the image plane side to secure a certain degree of back focal length also at the wide angle end.

Also, the zoom lens used in the photographing optical system of the present invention is provided, in succession from the object side, with a first lens unit of negative refractive power, a stop, a second lens unit of weak refractive power, and at least two lens units of positive refractive power, and is characterized in that the first lens unit and the stop are normally fixed relative to the image plane, and said at least two lens units of positive refractive power are moved from the image plane side toward the object side during the focal length change from the wide angle end to the telephoto end. As described above, the pair of left and right first lens units are normally fixed, and the left and right common lens unit present rearwardly thereof effects focal length change and the correction of the image plane resulting from the focal length change or the correction of the image plane relative to the fluctuation of the object distance to thereby suppress the fluctuation of magnification and the occurrence of the deviation of the optical axis when the left and right parallax images during the focal length change and the focusing operation are obtained.

Now, in the present embodiment, it is preferable that the angle (vertical angle Q) formed between the surface PL and the surface PR of the triangle pole prism P as the composite optical element for laying the left and right optical axes one upon the other satisfy the condition that $$65°<Q<85° \tag{1}$$

Conditional expression (1) restricts the vertical angle formed between the reflecting surfaces of the triangle pole prism constituting the composite optical element. It is preferable that the vertical angle formed between the reflecting surfaces of the triangle pole prism be defined within a range smaller than the upper limit value of conditional expression (1) to prevent the eclipse of the photographing optical system by the stop SP. On the other hand, if the lower limit value of conditional expression (1) is exceeded, the reflecting mirrors ML and MR will become large, and this is not preferable.

More preferably, the numerical value range of conditional expression (1) may be $$70°<Q<80°.$$

Also, when the distance from the vertex of the lens surface most adjacent to the object side which constitutes the optical system to the object side pupil is defined as Linp, it is preferable that the condition that $$5 \text{ mm} < Linp < 15 \text{ mm} \tag{2}$$

be satisfied.

Conditional expression (2) restricts the position of the entrance pupil of the lens system used in the stereoscopic photographing optical system. In an area exceeding the lower limit value of conditional expression (2), the spacing between the stop and the first lens unit becomes too small and therefore, the height of the off-axial ray of light in the first lens unit becomes small and the correction of off-axial aberration becomes difficult. On the other hand, in an area exceeding the upper limit value of conditional expression (2), the effective diameter of the first lens unit becomes large and the whole becomes bulky, and this is not preferable.

More preferably, the numerical value range of conditional expression (2) may be $$7 \text{ mm} < \text{Linp} < 13 \text{ mm}.$$

Also, when the focal length of the entire system at the wide angle end is defined as fw and the back focal length (the air-converted distance from the last lens surface to the image plane) when the object distance at the wide angle end is infinity is defined as bfw, it is preferable that the condition that $$1.5 < \text{bfw/fw} \quad (3)$$

be satisfied.

Conditional expression (3) restricts the ratio between the focal length of the entire system at the wide angle end of the zoom lens of the present invention and the back focal length when the object distance at the wide angle end is infinity. In an area exceeding the lower limit value of conditional expression (3), the back focal length becomes too small and therefore, it becomes impossible to secure a space for disposing a color separation prism or the like therein, and this is not preferable.

More preferably, the numerical value range of conditional expression (3) may be $$2.1 < \text{bfw/fw}.$$

Also, when the focal length of the second lens unit is defined as f2 and the focal length of the entire system at the wide angle end is defined as fw, it is preferable that the condition that $$-0.3 < \text{fw/f2} < 0.3 \quad (4)$$

be satisfied.

Conditional expression (4) restricts the ratio between the focal length of the second lens unit of the zoom lens of the present invention and the focal length of the entire system at the wide angle end. In an area exceeding the lower limit value of conditional expression (4), the negative power of the second lens unit becomes too strong and therefore, the combined power of the first lens unit and the second lens unit becomes too strong and curvature of image field becomes over, and this is not good. In an area exceeding the upper limit value of conditional expression (4), the positive power of the second lens unit becomes too strong and therefore, the combined power of the first lens unit and the second lens unit becomes weak and it becomes difficult to make the focal length of the entire system at the wide angle end small, and this is not preferable.

More preferably, the numerical value range of conditional expression (4) may be $$-0.2 < \text{fw/f2} < 0.2.$$

Further, in the zoom lens of the present invention, the stop is disposed between the first lens unit and the second lens unit and therefore, in order to well correct off-axial aberrations created in the second and subsequent lens units, it is desirable that the first lens unit be comprised of at least one positive lens and one negative lens. This is because the first lens unit is of negative refractive power and the second and subsequent lens units are of positive refractive power as a whole and therefore, as the whole construction, the zoom lens is of a retrofocus type and in off-axial rays of light, distortion and astigmatism in the same direction are liable to occur and in order to correct that distortion and that astigmatism, it is desirable to dispose a positive lens on the object side of the first lens unit.

Also, it is desirable in order to correct spherical aberration created by the first lens unit that the second lens unit be comprised of a cemented lens comprising, in succession from the object side, a positive meniscus lens of a high refractive index having its concave surface facing the object side and a negative meniscus lens of a low refractive index having its concave surface facing the object side, the positive meniscus lens and the negative meniscus lens being cemented together. By the cemented surface thereof, the spherical aberration of a converging system is greatly created to thereby well correct the spherical aberration of a diverging system created in the first lens unit.

Also, it is desirable that a convex (positive) air lens creating the aberrations of the diverging system be constructed in at least one of at least two positive lens units disposed more adjacent to the image plane side than the second lens unit. By the effect of this air lens, the aberrations of the converging system created by the positive lens in the at least two positive lens units disposed more adjacent to the image plane than the second lens unit can be corrected well.

Also, to suppress high-order chromatic aberration of magnification to a small level, it is good to effect the correction of chromatic aberration by a lens unit of which the height of the off-axial ray is small.

While in the present embodiment, a CCD is used as the image pickup element, silver salt film may be disposed instead of the CCD to thereby construct a stereoscopic camera or a stereoscopic animation camera. When the image pickup element is silver salt film, moiré is not created and therefore, the low-pass filter LPF may be eliminated.

The numerical data of the optical systems of Numerical Value Embodiments 1 to 4 will be shown below.

In each numerical value embodiment, vi represents the radius of curvature of the i-th surface from the object side, di represents the thickness or the air space of the i-th member from the object side, and ni and vi represent the refractive index and Abbe number, respectively, of the glass of the i-th member from the object side. The last several flat surfaces in each numerical value embodiment are glass blocks such as color separation prisms and filters.

Also, the relations among the aforementioned conditional expressions and the numerical values in the numerical value embodiments are shown in Table 1 below.

Also, the aberrations of the optical systems of the respective numerical value embodiments are shown in FIGS. 6 to 17. FIGS. 6, 7 and 8 show the aberrations at the wide angle end, the intermediate portion and the telephoto end, respectively, of the optical system of Numerical Value Embodiment 1. FIGS. 9, 10 and 11 show the aberrations at the wide angle end, the intermediate portion and the telephoto end, respectively, of the optical system of Numerical Value Embodiment 2. FIGS. 12, 13 and 14 show the aberrations at the wide angle end, the intermediate portion and the telephoto end, respectively, of the optical system of Numerical Value Embodiment 3. FIGS. 15, 16 and 17 show the aberrations at the wide angle end, the intermediate portion and the telephoto end, respectively, of the optical system of Numerical Value Embodiment 4.

Numerical Value Embodiment 1 f = 7.70911 to 21.83    fno = 1:2 to 4.5    2ω = 21.3° to 7.8°

| | | | | |
|---|---|---|---|---|
| r1 = | −87.189 | d1 = | 1.85 | n1 = 1.80518    ν1 = 25.4 |
| r2 = | −26.718 | d2 = | 0.30 | |
| r3 = | −67.919 | d3 = | 0.60 | n2 = 1.88300    ν2 = 40.8 |
| r4 = | 10.618 | d4 = | 21.10 | |
| r5 = | ∞ (stop) | d5 = | variable | |
| r6 = | −24.054 | d6 = | 2.45 | n3 = 1.83400    ν3 = 37.2 |
| r7 = | −13.609 | d7 = | 0.90 | n4 = 1.48749    ν4 = 70.2 |
| r8 = | −70.444 | d8 = | variable | |
| r9 = | −17.138 | d9 = | 1.40 | n5 = 1.51742    ν5 = 52.4 |
| r10 = | −20.320 | d10 = | 0.15 | |
| r11 = | −432.818 | d11 = | 3.50 | n6 = 1.49700    ν6 = 81.5 |
| r12 = | −42.602 | d12 = | 0.15 | |
| r13 = | 157.019 | d13 = | 3.25 | n7 = 1.49700    ν7 = 81.5 |
| r14 = | −91.922 | d14 = | variable | |
| r15 = | 18.794 | d15 = | 9.85 | n8 = 1.49700    ν8 = 81.5 |
| r16 = | −118.328 | d16 = | 0.94 | |
| r17 = | 131.689 | d17 = | 2.05 | n9 = 1.49700    ν9 = 81.5 |
| r18 = | −652.843 | d18 = | 0.96 | |
| r19 = | −65.988 | d19 = | 1.30 | n10 = 1.77250   ν10 = 49.6 |
| r20 = | 161.490 | d20 = | 0.66 | |
| r21 = | 66.076 | d21 = | 1.10 | n11 = 1.83400   ν11 = 37.2 |
| r22 = | 10.850 | d22 = | 9.20 | n12 = 1.60311   ν12 = 60.6 |
| r23 = | −23.205 | d23 = | 0.64 | |
| r24 = | −17.281 | d24 = | 0.90 | n13 = 1.80610   ν13 = 40.9 |
| r25 = | −56.048 | d25 = | variable | |
| r26 = | −79.009 | d26 = | 1.60 | n14 = 1.48749   ν14 = 70.2 |
| r27 = | −56.828 | d27 = | 3.55 | |
| r28 = | ∞ | d28 = | 0.81 | n15 = 1.55000   ν15 = 60.0 |
| r29 = | ∞ | d29 = | 1.60 | n16 = 1.52000   ν16 = 69.0 |
| r30 = | ∞ | d30 = | 0.57 | n17 = 1.55000   ν17 = 60.0 |
| r31 = | ∞ | d31 = | 20.00 | n18 = 1.58913   ν18 = 61.2 |
| r32 = | ∞ | d32 = | 0.80 | n19 = 1.51633   ν19 = 64.2 |
| r33 = | ∞ | | | |

| Focal length variable spacing | 7.71 | 12.34 | 21.83 |
|---|---|---|---|
| d5 | 6.10 | 6.10 | 6.10 |
| d8 | 36.63 | 18.44 | 4.71 |
| d14 | 1.34 | 9.39 | 1.20 |
| d25 | 1.77 | 11.92 | 33.85 |

Numerical Value Embodiment 2 f = 7.70457 to 21.83    fno = 1:2 to 4.5    2ω = 21.3° to 7.8°

| | | | | |
|---|---|---|---|---|
| r1 = | −77.776 | d1 = | 1.83 | n1 = 1.80518    ν1 = 25.4 |
| r2 = | −25.186 | d2 = | 0.15 | |
| r3 = | −72.090 | d3 = | 0.60 | n2 = 1.88300    ν2 = 40.8 |
| r4 = | 10.635 | d4 = | 20.02 | |
| r5 = | ∞ (stop) | d5 = | variable | |
| r6 = | −17.316 | d6 = | 2.28 | n3 = 1.83400    ν3 = 37.2 |
| r7 = | −12.117 | d7 = | 0.80 | n4 = 1.48749    ν4 = 70.2 |
| r8 = | −29.752 | d8 = | variable | |
| r9 = | −16.890 | d9 = | 1.40 | n5 = 1.60342    ν5 = 38.0 |
| r10 = | −19.588 | d10 = | 0.15 | |
| r11 = | −225.635 | d11 = | 3.62 | n6 = 1.49700    ν6 = 81.5 |
| r12 = | −40.744 | d12 = | 0.16 | |
| r13 = | 143.290 | d13 = | 3.53 | n7 = 1.49700    ν7 = 81.5 |
| r14 = | −93.501 | d14 = | variable | |
| r15 = | 20.469 | d15 = | 9.60 | n8 = 1.49700    ν8 = 81.5 |
| r16 = | −118.264 | d16 = | 0.38 | |
| r17 = | 79.804 | d17 = | 3.25 | n9 = 1.48749    ν9 = 70.2 |
| r18 = | −187.608 | d18 = | 0.95 | |
| r19 = | −65.602 | d19 = | 1.30 | n10 = 1.77250   ν10 = 49.6 |
| r20 = | 90.168 | d20 = | 1.21 | |
| r21 = | 63.318 | d21 = | 1.20 | n11 = 1.83400   ν11 = 37.2 |
| r22 = | 11.129 | d22 = | 9.20 | n12 = 1.60311   ν12 = 60.6 |
| r23 = | −21.899 | d23 = | 0.40 | |
| r24 = | −18.428 | d24 = | 1.00 | n13 = 1.78590   ν13 = 44.2 |
| r25 = | −71.127 | d25 = | variable | |
| r26 = | ∞ | d26 = | 1.60 | n14 = 1.51633   ν14 = 64.1 |
| r27 = | ∞ | d27 = | 4.00 | |
| r28 = | ∞ | d28 = | 0.81 | n15 = 1.55000   ν15 = 60.0 |
| r29 = | ∞ | d29 = | 1.60 | n16 = 1.52000   ν16 = 69.0 |
| r30 = | ∞ | d30 = | 20.00 | n17 = 1.58913   ν17 = 61.2 |
| r31 = | ∞ | d31 = | 0.57 | n18 = 1.55000   ν18 = 60.0 |
| r32 = | ∞ | d32 = | 0.80 | n19 = 1.51633   ν19 = 64.2 |
| r33 = | ∞ | | | |

| Focal length variable spacing | 7.70 | 12.48 | 21.83 |
|---|---|---|---|
| d5 | 6.53 | 6.53 | 6.53 |
| d8 | 39.53 | 19.03 | 3.57 |
| d14 | 1.49 | 12.68 | 7.61 |
| d25 | 1.06 | 10.38 | 30.91 |

Numerical Value Embodiment 3 f = 7.70519 to 21.83    fno = 1:2 to 4.5    2ω = 21.3° to 7.8°

| | | | | |
|---|---|---|---|---|
| r1 = | −79.900 | d1 = | 1.86 | n1 = 1.80518    ν1 = 25.4 |
| r2 = | −23.431 | d2 = | 0.19 | |
| r3 = | −54.190 | d3 = | 0.60 | n2 = 1.88300    ν2 = 40.8 |
| r4 = | 10.661 | d4 = | 20.03 | |
| r5 = | ∞ (stop) | d5 = | variable | |
| r6 = | −15.979 | d6 = | 2.24 | n3 = 1.83400    ν3 = 37.2 |
| r7 = | −11.756 | d7 = | 0.80 | n4 = 1.48749    ν4 = 70.2 |
| r8 = | −25.517 | d8 = | variable | |
| r9 = | −17.236 | d9 = | 1.40 | n5 = 1.60342    ν5 = 38.0 |
| r10 = | −20.264 | d10 = | 0.13 | |
| r11 = | −166.704 | d11 = | 3.82 | n6 = 1.49700    ν6 = 81.5 |
| r12 = | −36.269 | d12 = | 0.16 | |
| r13 = | 149.167 | d13 = | 3.48 | n7 = 1.49700    ν7 = 81.5 |
| r14 = | −95.752 | d14 = | variable | |
| r15 = | 20.581 | d15 = | 9.91 | n8 = 1.49700    ν8 = 81.5 |
| r16 = | −99.859 | d16 = | 2.13 | |
| r17 = | −95.956 | d17 = | 1.50 | n9 = 1.77250    ν9 = 49.6 |
| r18 = | 216.409 | d18 = | 2.67 | |
| r19 = | 73.146 | d19 = | 1.30 | n10 = 1.83400   ν10 = 37.2 |
| r20 = | 11.750 | d20 = | 9.20 | n11 = 1.60311   ν11 = 60.6 |
| r21 = | −22.614 | d21 = | 0.46 | |
| r22 = | −18.667 | d22 = | 1.00 | n12 = 1.78590   ν12 = 44.2 |
| r23 = | −58.545 | d23 = | variable | |
| r24 = | ∞ | d24 = | 1.60 | n13 = 1.51633   ν13 = 64.1 |
| r25 = | ∞ | d25 = | 4.00 | |
| r26 = | ∞ | d26 = | 0.81 | n14 = 1.55000   ν14 = 60.0 |
| r27 = | ∞ | d27 = | 1.60 | n15 = 1.52000   ν15 = 69.0 |
| r28 = | ∞ | d28 = | 20.00 | n16 = 1.58913   ν16 = 61.2 |
| r29 = | ∞ | d29 = | 0.57 | n17 = 1.55000   ν17 = 60.0 |
| r30 = | ∞ | d30 = | 0.80 | n18 = 1.51633   ν18 = 64.2 |
| r31 = | ∞ | | | |

| Focal length variable spacing | 7.71 | 12.51 | 21.83 |
|---|---|---|---|
| d5 | 6.69 | 6.69 | 6.69 |
| d8 | 39.95 | 18.87 | 2.97 |
| d14 | 1.50 | 12.90 | 7.29 |
| d23 | 2.78 | 12.46 | 33.97 |

Numerical Value Embodiment 4 f = 7.70266 to 21.83    fno = 1:2 to 4.5    2ω = 21.3° to 7.8°

| | | | | |
|---|---|---|---|---|
| r1 = | −116.579 | d1 = | 1.38 | n1 = 1.84666    ν1 = 23.8 |
| r2 = | −28.027 | d2 = | 0.20 | |

-continued

Numerical Value Embodiment 4

| r3 = | −60.228 | d3 = | 0.60 | n2 = 1.88300 | ν2 = 40.8 |
|---|---|---|---|---|---|
| r4 = | 12.644 | d4 = | 21.98 | | |
| r5 = | ∞ (stop) | d5 = | variable | | |
| r6 = | −12.486 | d6 = | 1.80 | n3 = 1.83400 | ν3 = 37.2 |
| r7 = | −10.437 | d7 = | 0.70 | n4 = 1.48749 | ν4 = 70.2 |
| r8 = | −18.016 | d8 = | variable | | |
| r9 = | −15.679 | d9 = | 1.20 | n5 = 1.60311 | ν5 = 60.6 |
| r10 = | −20.665 | d10 = | 0.20 | | |
| r11 = | −136.241 | d11 = | 3.87 | n6 = 1.49700 | ν6 = 81.5 |
| r12 = | −28.238 | d12 = | 0.19 | | |
| r13 = | 33.850 | d13 = | 4.90 | n7 = 1.49700 | ν7 = 81.5 |
| r14 = | −132.071 | d14 = | variable | | |
| r15 = | 26.649 | d15 = | 5.53 | n8 = 1.49700 | ν8 = 81.5 |
| r16 = | −137.451 | d16 = | variable | | |
| r17 = | −1782.021 | d17 = | 1.00 | n9 = 1.83400 | ν9 = 37.2 |
| r18 = | 12.527 | d18 = | 6.98 | n10 = 1.60311 | ν10 = 60.6 |
| r19 = | −52.765 | d19 = | 1.09 | | |
| r20 = | −22.961 | d20 = | 1.00 | n11 = 1.80610 | ν11 = 40.9 |
| r21 = | −32.848 | d21 = | variable | | |
| r22 = | ∞ | d22 = | 25.40 | n12 = 1.58913 | ν12 = 61.1 |
| r23 = | ∞ | | | | |

| Focal length variable spacing | 7.70 | 13.44 | 21.83 |
|---|---|---|---|
| d5 | 9.35 | 6.22 | 3.85 |
| d8 | 31.50 | 14.51 | 1.69 |
| d14 | 0.99 | 14.35 | 14.02 |
| d16 | 3.40 | 0.96 | 1.79 |
| d21 | 0.21 | 9.42 | 24.11 |

The values of the respective conditional expressions of the optical systems of the numerical value embodiments will be shown below.

TABLE 1

| Conditional expression | Numerical Value Embodiment 1 | Numerical Value Embodiment 2 | Numerical Value Embodiment 3 | Numerical Value Embodiment 4 |
|---|---|---|---|---|
| (2) | 9.79 | 9.50 | 9.50 | 10.65 |
| (3) | 2.704 | 3.008 | 3.231 | 3.270 |
| (4) | −0.0058 | −0.0025 | −0.0024 | −0.0168 |

As described above, the optical system for photographing a plurality of parallax images is appropriately set, whereby there can be achieved a stereoscopic image photographing optical system which is good in optical performance and is free of color irregularity and can easily obtain a good stereoscopic image (parallax image) and a zoom lens suitable therefor.

Particularly, there can be realized a compact stereoscopic photographing optical system of simple construction which is free of the fluctuations of the left and right magnifications and the deviation of the optical axis during the zooming operation and during the focusing operation and is also free of the color irregularity by the optical axis combining system. Also, the zoom lens disclosed in the present embodiment, in spite of being a variable power optical system, is free of the fluctuation of the entrance pupil position during focal length change and is small in the diameter of the fore lens and is therefore applicable not only to a stereoscopic image photographing optical system but also to other uses such as a monitoring camera, etc.

Now, when liquid crystal shutters are used as the shutters SL and SR of FIG. 1 and a low-pass filter utilizing double refraction is used as the optical low-pass filter LPF, the light after being passed through the liquid crystal shutters is polarized light and as previously described, this has led to the problem that the low-pass effect weakens and the picked-up image becomes unsightly. There has also been the problem that the luster of the object seen by the naked eye and the luster of the picked-up image of the object differ remarkably from each other.

Figure 18:
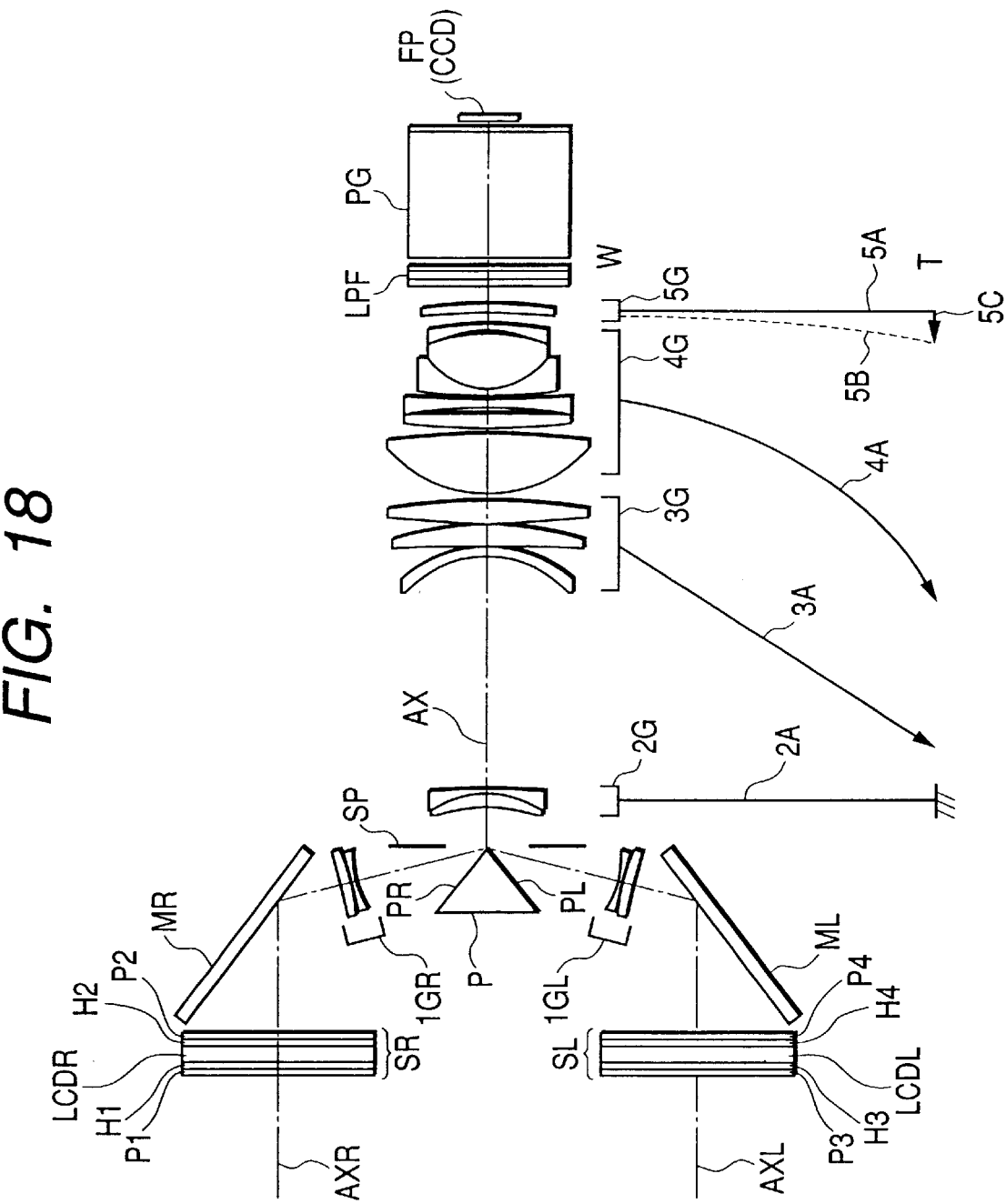
FIG. 18 shows is a cross-sectional view of the essential portions of a stereoscopic photographing optical system using a liquid crystal shutter.

An embodiment shown in FIG. 18 solves the above-noted problems arising when liquid crystal shutters are used as the shutters SL and SR, by applying a contrivance to the liquid crystal shutters. The construction of this embodiment is entirely the same as that of the embodiment shown in FIG. 1 (Numerical Value Embodiment 1) in the other points than the liquid crystal shutters SL and SR and therefore need not be described.

The liquid crystal shutters SL and SR as the quantity-of-light controlling means for the left and right eyes in the present embodiment are of the same construction. The right liquid crystal shutter SR is comprised, in succession from the object side, of a quarter wavelength plate P1, a polarizing plate H1, liquid crystal LCDR, a polarizing plate H2 and a quarter wavelength plate P2. The left liquid crystal shutter SL is likewise comprised, in succession from the object side, of a quarter wavelength plate P3, a polarizing plate H3, a liquid crystal layer LCDL, a polarizing plate H4 and a quarter wavelength plate P4.

Now, it is preferable to set an angle (θ) defined by the polarization axis of the polarizing plate and the optical axis of the quarter wavelength plate to satisfy the condition of 30°<θ<60°. More preferably, it is desirable to satisfy the condition of 35°<θ<55°. In particular, in the present embodiment, the angle (θ) defined by the polarization axis of the polarizing plate and the optical axis of the quarter wavelength plate is set to 45° so as to produce circularly polarized light satisfactorily.

The quarter wavelength plates P1, P2 (P3, P4) are disposed on both of the object side and the image pickup element side of the liquid crystal shutter SR (SL) comprised of the liquid crystal LCDR (LCDL) and the two polarizing plates H1, H2 (H3, H4) to thereby prevent any change in the luster of the object by polarization and the creation of moire by any decrease in the effect of the rock crystal low-pass filter LPF by polarization, and a natural image is photographed.

The quarter wavelength plates P1, P2 (P3, P4) are disposed on the opposite sides of the liquid crystal shutter SR (SL), whereby linearly polarized light passing through the liquid crystal shutter SR (SL) becomes circularly polarized light on the object side and the image pickup side and therefore, the influence of an object having a polarizing characteristic and a decrease in the effect of the rock crystal low-pass filter for separating rays of light by the utilization of double refraction are made small.

The above-noted problems when image pickup is effected by the utilization of the light passed through the polarizing plate are not limited to the hitherto described stereoscopic image photographing optical system, but arise also in an image pickup apparatus having only one optical axis. What will now be described is an embodiment which solves the above-noted problems in an ordinary image pickup apparatus which is not for photographing parallax images.

Figure 19:
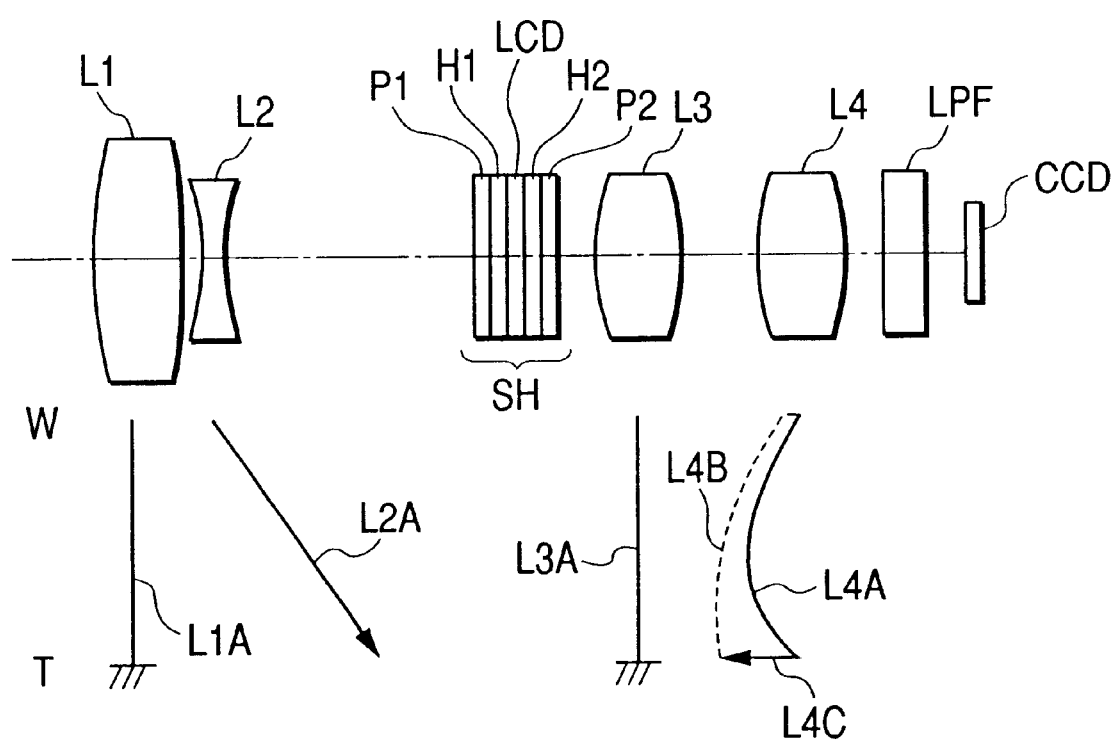
FIG. 19 is a cross-sectional view of the essential portions of the optical system of an image pickup apparatus having quantity-of-light controlling means utilizing a polarizing plate.

FIG. 19 is a cross-sectional view of the essential portions of an embodiment of the image pickup apparatus which solves the above-noted problems. The image pickup optical system of this embodiment is comprised of quantity-of-light controlling means having a polarizing plate, and an image pickup lens, and a quarter wavelength plate is disposed on at least one of the object side and the image pickup element side of the quantity-of-light controlling means.

The image pickup apparatus of the present embodiment has, in succession from the object side, a first lens unit L1 of positive refractive power, a second lens unit L2 of negative refractive power, quantity-of-light controlling means SH, a third lens unit L3 of positive refractive power, a fourth lens unit L4 of positive refractive power, a rock crystal low-pass filter LPF and an image pickup element CCD.

During the focal length change from the wide angle end (Wide end) to the telephoto end (Tele end), the first lens unit L1 and the third lens unit L3 are fixed and the second lens unit L2 is moved from the object side toward the image pickup element side as indicated by a locus L2A to thereby effect the focal length change, and the fourth lens unit L4 is moved as indicated by a locus L4A to thereby effect the correction of the image plane position resulting from the focal length change.

Also, the correction of the image plane, i.e., focusing, resulting from the fluctuation of the object distance is effected with the fourth lens unit L4 moved on the optical axis thereof.

Solid line L4A indicates the movement locus of the fourth lens unit L4 resulting from the focal length change when the object distance is infinity, and dotted line L4B indicates the movement locus of the fourth lens unit L4 resulting from the focal length change when the object distance is close range.

Straight line L4C indicates the direction of movement of the fourth lens unit L4 when focusing is effected from the object at infinity to the object at close range at the wide angle end.

The quantity-of-light controlling means SH is comprised, in succession from the object side, of a quarter wavelength plate P1, a polarizing plate H1, liquid crystal LCD, a polarizing plate H2 and a quarter wavelength plate P2.

The image pickup element CCD is an image pickup element periodically introducing an image thereinto. The present embodiment uses, instead of a mechanical stop, the quantity-of-light controlling means by liquid crystal disposed in the optical system, and is designed such that the transmission density of the quantity-of-light controlling means SH changes in conformity with the luminance of the object. In order to prevent any decrease in the effect of the rock crystal low-pass filter by polarization and any change in the luster of the object by polarization, the quantity-of-light controlling means comprised of the two polarizing plates H1 and H2 sandwiching the liquid crystal layer therebetween has the quarter wavelength plates P1 and P2 disposed before and behind it.

According to the embodiments shown in FIGS. 18 and 19, there can be achieved an image pickup optical system in which when the quantity of passed light is controlled by the use of polarization to form the image of the object on the image pickup element such as a CCD, black and white moire and color moireoccur little and an image in which the luster of the object is natural can be obtained easily, and a stereoscopic image photographing optical system using the same.

Particularly, the quantity-of-light controlling means having the polarizing plates has quarter wavelength plates disposed on the opposite sides thereof and therefore, any change in the luster of the object by polarization and the occurrence of moire by the decrease in the effect of the rock crystal low-pass filter by polarization can be prevented and natural images can be photographed.

Also, when such a stereoscopic image that has two left and right liquid crystal shutters and directs an image having left and right parallaxes to an image pickup element is to be obtained, a natural image approximate to the image the photographer sees with his naked eye can be obtained.

What is claimed is:

1. An optical system comprising:
   a pair of forward optical components each having a shutter for controlling the amount of transmission of a light from an object;
   an optical member for laying the optical axes of said pair of forward optical components one upon the other;
   a rearward optical component disposed so that the optical axis thereof may coincide with said optical axes laid one upon the other; and
   a stop disposed at or near a position whereat the optical axes of said pair of forward optical components intersect with each other;
   said optical system alternately varying the amounts of transmission of the light transmitted through the shutters of said pair of forward optical components to thereby time-serially form a parallax image.

2. The optical system of claim 1, wherein each of said pair of forward optical components further has:
   a mirror for reflecting the light from said object; and
   a lens unit for refracting the light from said object.

3. The optical system of claim 1, wherein said optical member is a triangle pole prism having two reflecting surfaces, and the optical axes of said pair of forward optical components and the optical axis of said rearward optical component intersect with one another on a ridgeline formed by said two reflecting surfaces.

4. The optical system of claim 3, wherein the angle Q formed by said two reflecting surfaces satisfies the condition that $$65°<Q<85°.$$

5. The optical system of claim 1, wherein said rearward optical component has a plurality of lens units movable in the direction of the optical axis thereof for focal length change.

6. The optical system of claim 1, wherein said shutters are disposed most adjacent to the object side.

7. The optical system of claim 2, wherein said shutters are disposed between said mirror and said lens unit.

8. The optical system of claim 1, wherein said shutters are liquid crystal shutters.

9. The optical system of claim 8, wherein a quarter wavelength plate is disposed on at least one of the object side and the image plane side of each of said liquid crystal shutters.

10. An optical system comprising:
    a pair of forward optical components each having a shutter for controlling the amount of transmission of a light from an object;
    an optical member for laying the optical axes of said pair of forward optical components one upon the other;
    a rearward optical component disposed so that the optical axis thereof may coincide with said optical axes laid one upon the other; and
    a stop disposed at or near a position whereat the optical axes of said pair of forward optical components intersect with each other,
    said optical system alternately varying the amounts of transmission of the light transmitted through the shutters of said pair of forward optical components to thereby time-serially form a parallax image;
    wherein said forward optical components have negative refractive power as a whole, and said rearward optical component has positive refractive power as a whole.

11. An image pickup optical system for a camera which takes an image formed on an image pickup surface, said image pickup optical system comprising:

quantity-of-light controlling means for controlling the amount of transmission of light by the utilization of polarization;

an image pickup lens for forming an image by the use of the light transmitted through said quantity-of-light controlling means; and a quarter wavelength plate disposed on at least the image plane side of said quantity-of-light controlling means.

12. An image pickup apparatus comprising:

quantity-of-light controlling means for controlling the amount of transmission of light by the utilization of polarization;

an image pickup lens for forming an image by the use of the light transmitted through said quantity-of-light controlling means;

an optical low-pass filter utilizing double refraction;

an image pickup element for periodically introducing the image thereinto; and a quarter wavelength plate disposed on at least one of the object side and the image plane side of said quantity-of-light controlling means.

\* \* \* \* \*

UNITED STATES PATENT AND TRADEMARK OFFICE
CERTIFICATE OF CORRECTION

PATENT NO.    : 6,414,791 B1
DATED         : July 2, 2002
INVENTOR(S)   : Sugawara It is certified that error appears in the above-identified patent and that said Letters Patent is hereby corrected as shown below:

Title page,
Item [56], References Cited, U.S. PATENT DOCUMENTS, insert the following:
-- 3,818,125    6/1974       Butterfield
   4,214,257    7/1980       Yamauchi
   4,178,090    12/1979      Marks et al. --

FOREIGN PATENT DOCUMENTS, insert the following:
-- PCT        97/18677    5/1997
   EP         0 107 091   9/1983 ---

OTHER PUBLICATIONS, insert the following:
-- Copy of Partial European Search Report dated 10/19/99

European Patent Office, Patent Abstracts of Japan, Publication No. 09 251624, dated 9/27/96

European Patent Office, Patent Abstracts of Japan, Publication No. 08 307908, dated 11/22/96 --

Column 4,
Line 40, "FIG. 16-A, 16-B," should read -- FIGS. 16-A, 16-B, --
Line 45, "FIG. 17-A, 17-B," should read -- FIGS. 17-A, 17-B, --
Line 50, "FIG. 18 shows is" should read -- FIG. 18 is --

Column 10,
Lines 53-67, delete and replace with the following paragraph:
-- Also, the aberrations of the optical systems of the respective numerical value embodiments are shown in Figs. 6-A - 17-D. Figs. 6-A – 8-D show the aberrations at the wide angle end, the intermediate portion and the telephoto end, respectively, of that optical system of Numerical Value, Embodiment 1. Figs. 9-A – 11-D show the aberrations at the wide angle end, the intermediate portion and the telephoto end, respectively, of the optical system of Numerical Value Embodiment 2. Figs. 12-A – 14-D show the aberrations at the wide angle end, the intermediate portion and the telephoto end, respectively, of the optical system of Numerical Value Embodiment 3. Figs. 15-A – 17-D show the aberrations at the wide angle end, the intermediate portion and the telephoto end, respectively, of the optical system of Numerical Value Embodiment 4. The aberrations shown in each series A-D are spherical aberration, astigmatism, distortion and chromatic aberration of magnification. --

UNITED STATES PATENT AND TRADEMARK OFFICE
CERTIFICATE OF CORRECTION

PATENT NO. : 6,414,791 B1
DATED : July 2, 2002
INVENTOR(S) : Sugawara

It is certified that error appears in the above-identified patent and that said Letters Patent is hereby corrected as shown below:

Column 12,
Line 64, in the chart entitled Numerical Value Embodiment 4, in the heading, "fno = 1:2 to 4.5" should read -- fno = 1:2 to 5 --

Signed and Sealed this

Twenty-eighth Day of June, 2005

JON W. DUDAS
*Director of the United States Patent and Trademark Office*